United States Patent
Nanba

(10) Patent No.: US 9,453,990 B2
(45) Date of Patent: Sep. 27, 2016

(54) ZOOM LENS AND IMAGE PICKUP APPARATUS HAVING THE SAME

(71) Applicant: CANON KABUSHIKI KAISHA, Tokyo (JP)

(72) Inventor: Norihiro Nanba, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 14/559,066

(22) Filed: Dec. 3, 2014

(65) Prior Publication Data

US 2015/0160442 A1 Jun. 11, 2015

(30) Foreign Application Priority Data

Dec. 6, 2013 (JP) ................. 2013-253639

(51) Int. Cl.
*G02B 15/14* (2006.01)
*G02B 13/00* (2006.01)
*G02B 15/173* (2006.01)

(52) U.S. Cl.
CPC ........... *G02B 13/009* (2013.01); *G02B 15/173* (2013.01)

(58) Field of Classification Search
CPC ...... G02B 15/00; G02B 15/15; G02B 15/16; G02B 15/163; G02B 15/20; G02B 15/22; G02B 15/24; G02B 13/009

USPC .......................................... 359/676, 686–688
See application file for complete search history.

(56) References Cited

U.S. PATENT DOCUMENTS

2010/0246025 A1* 9/2010 Saito .................. G02B 27/0062
359/676

FOREIGN PATENT DOCUMENTS

JP 2008-191286 A 8/2008
JP 2008-191291 A 8/2008

* cited by examiner

*Primary Examiner* — Darryl J Collins
(74) *Attorney, Agent, or Firm* — Canon U.S.A. Inc., IP Division

(57) ABSTRACT

A zoom lens includes, in order from an object side to an image side, a first lens unit having positive refractive power, a second lens unit having negative refractive power, and a rear lens group having a plurality of lens units at least one of which has positive refractive power. The distance between the first lens unit and the second lens unit is greater at a telephoto end than at a wide angle end. The first lens unit includes a positive lens and a negative lens. The rear lens group includes a lens unit R comprising a positive lens and a negative lens. The lens unit R has the highest zoom ratio among the lens units included in the rear lens group. The materials of the positive and negative lenses included in the first lens unit and in the lens unit R are selected appropriately based on predetermined mathematical conditions.

13 Claims, 22 Drawing Sheets

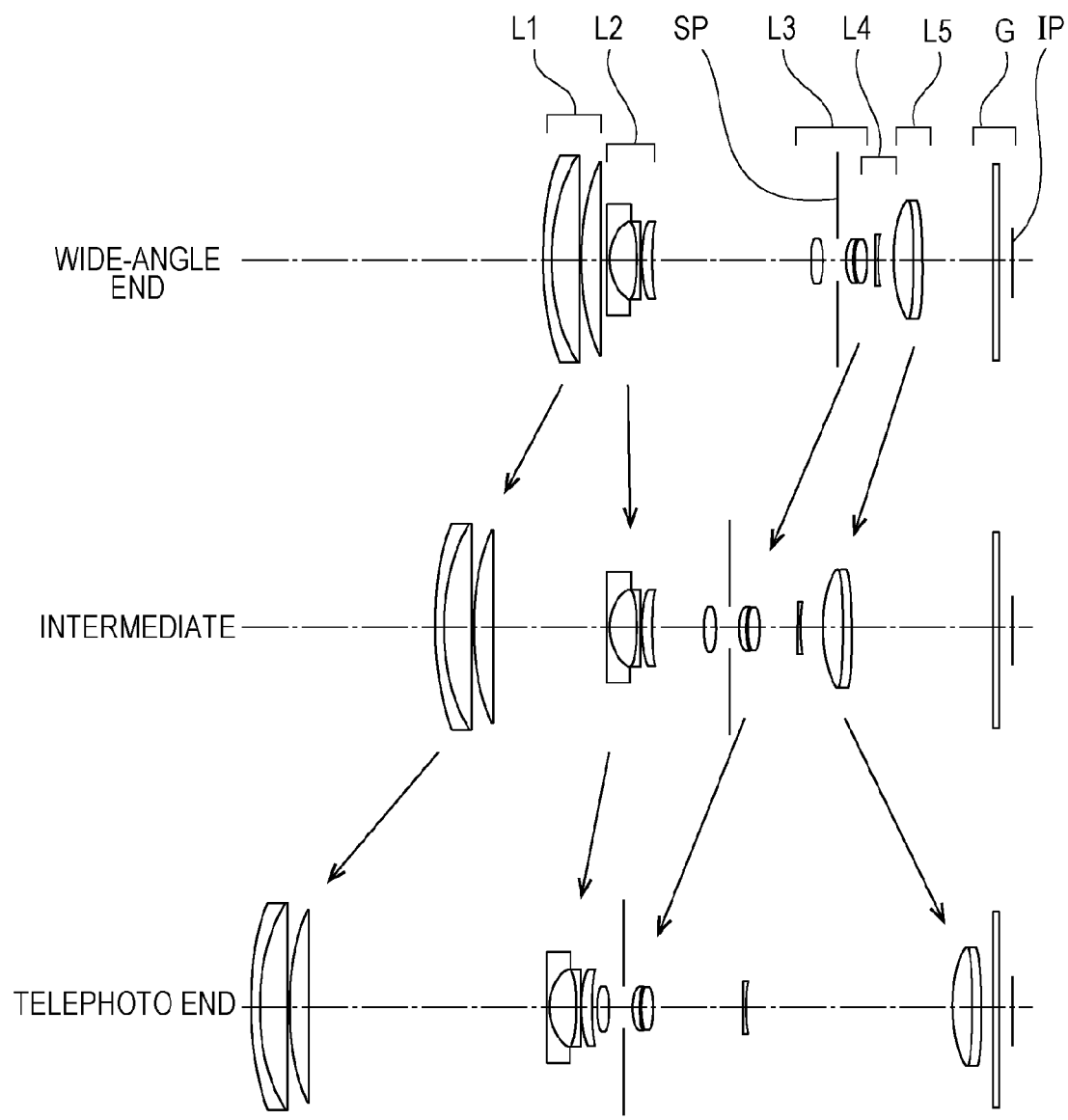

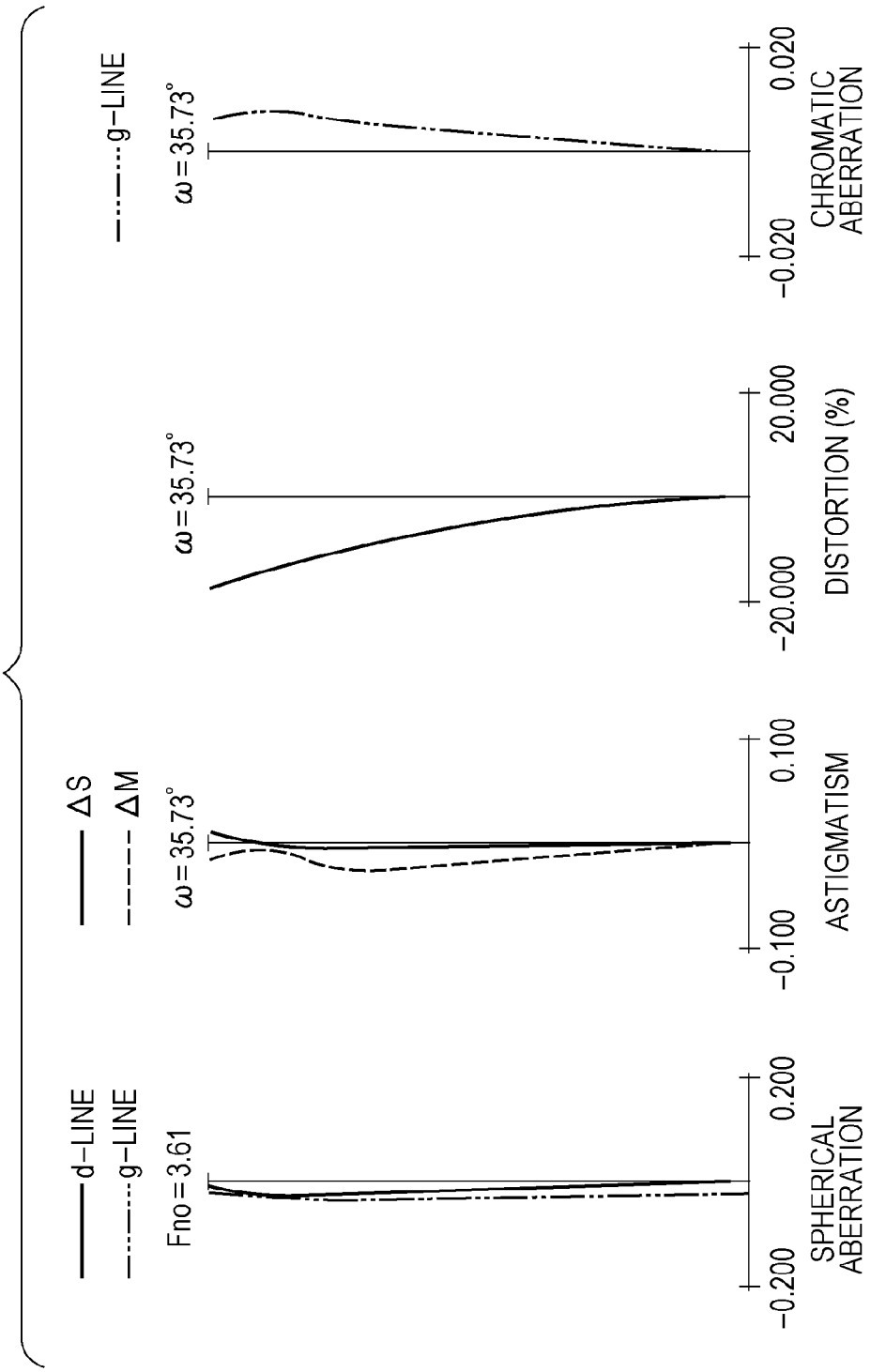

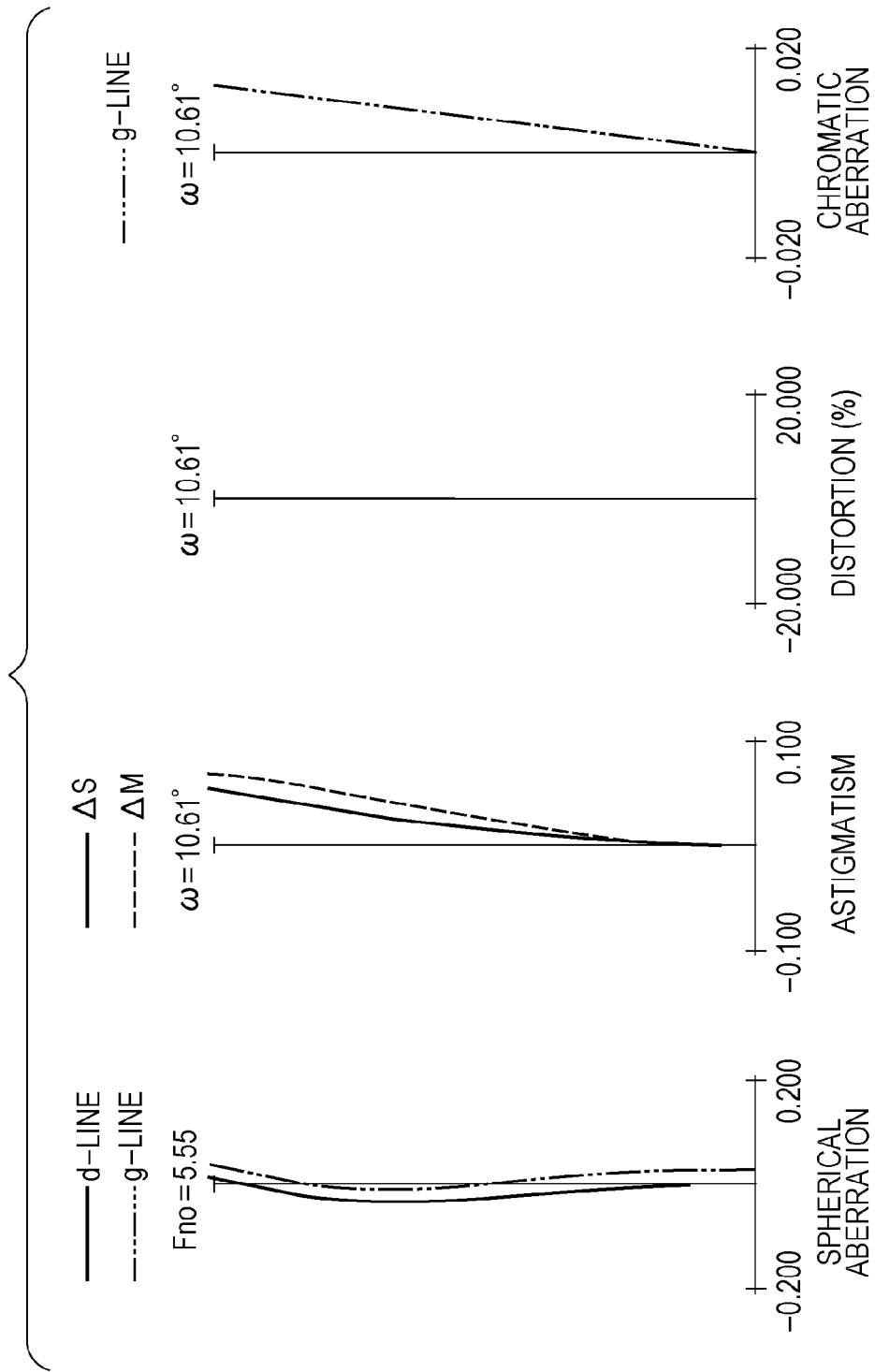

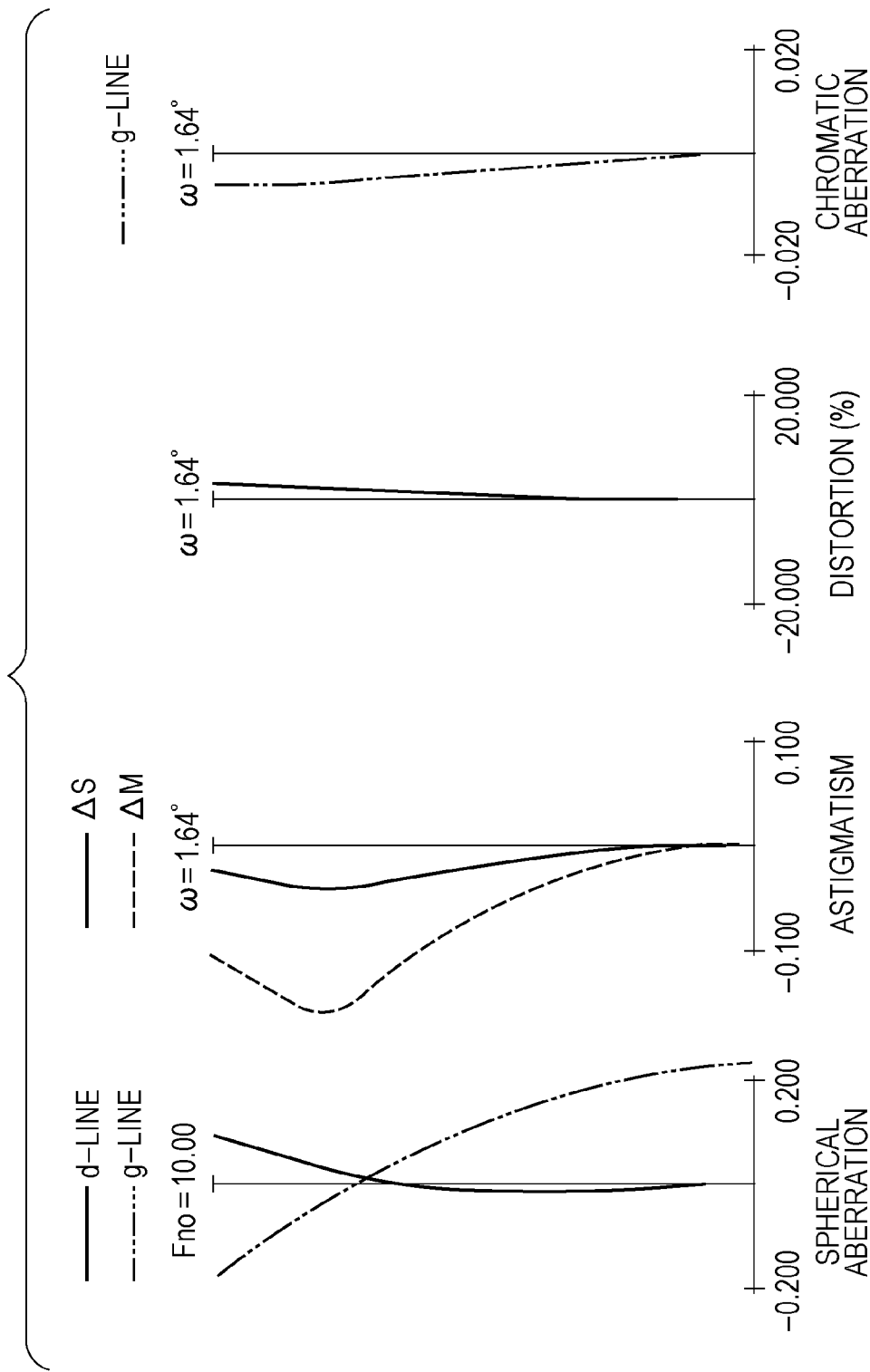

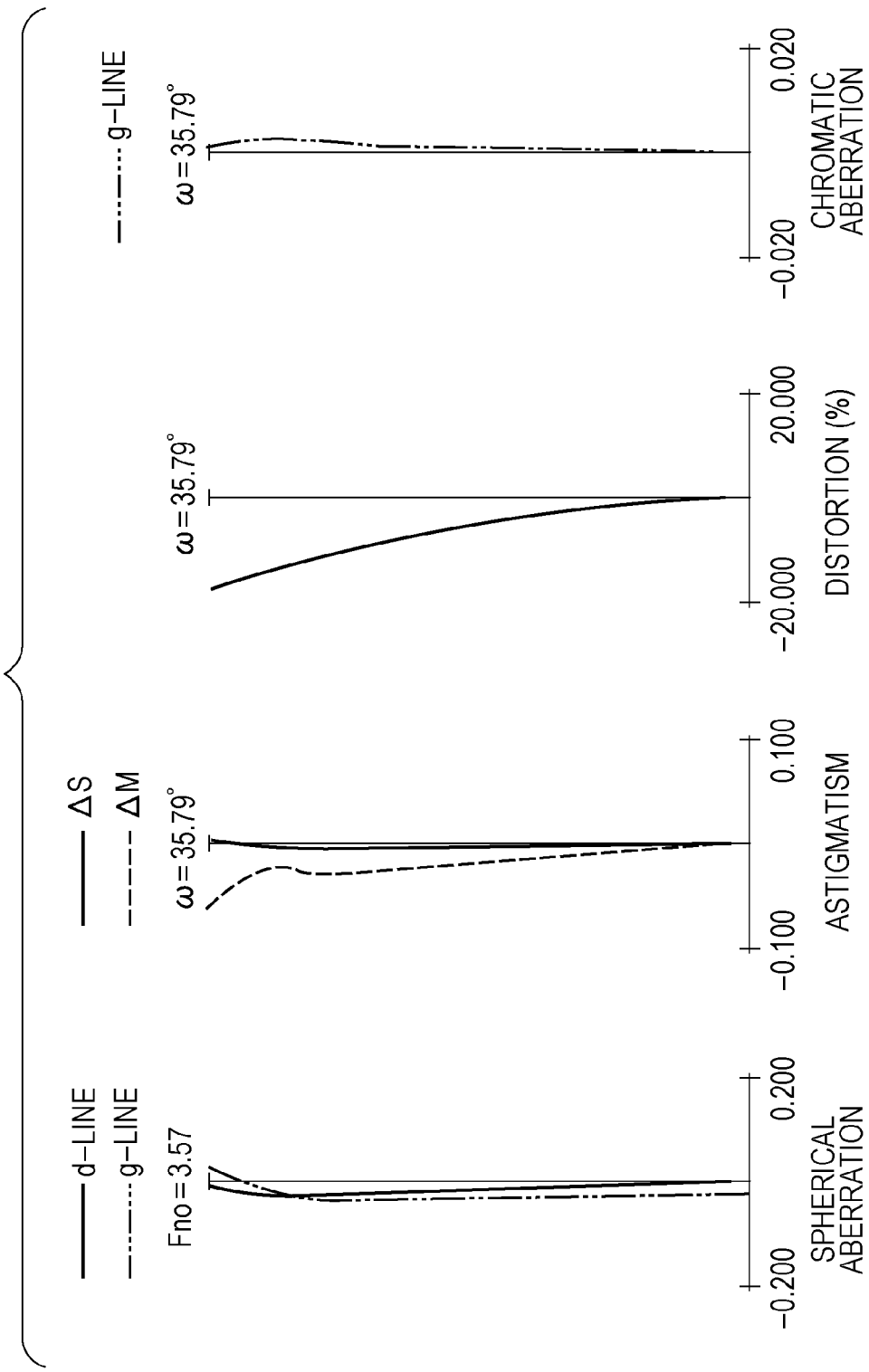

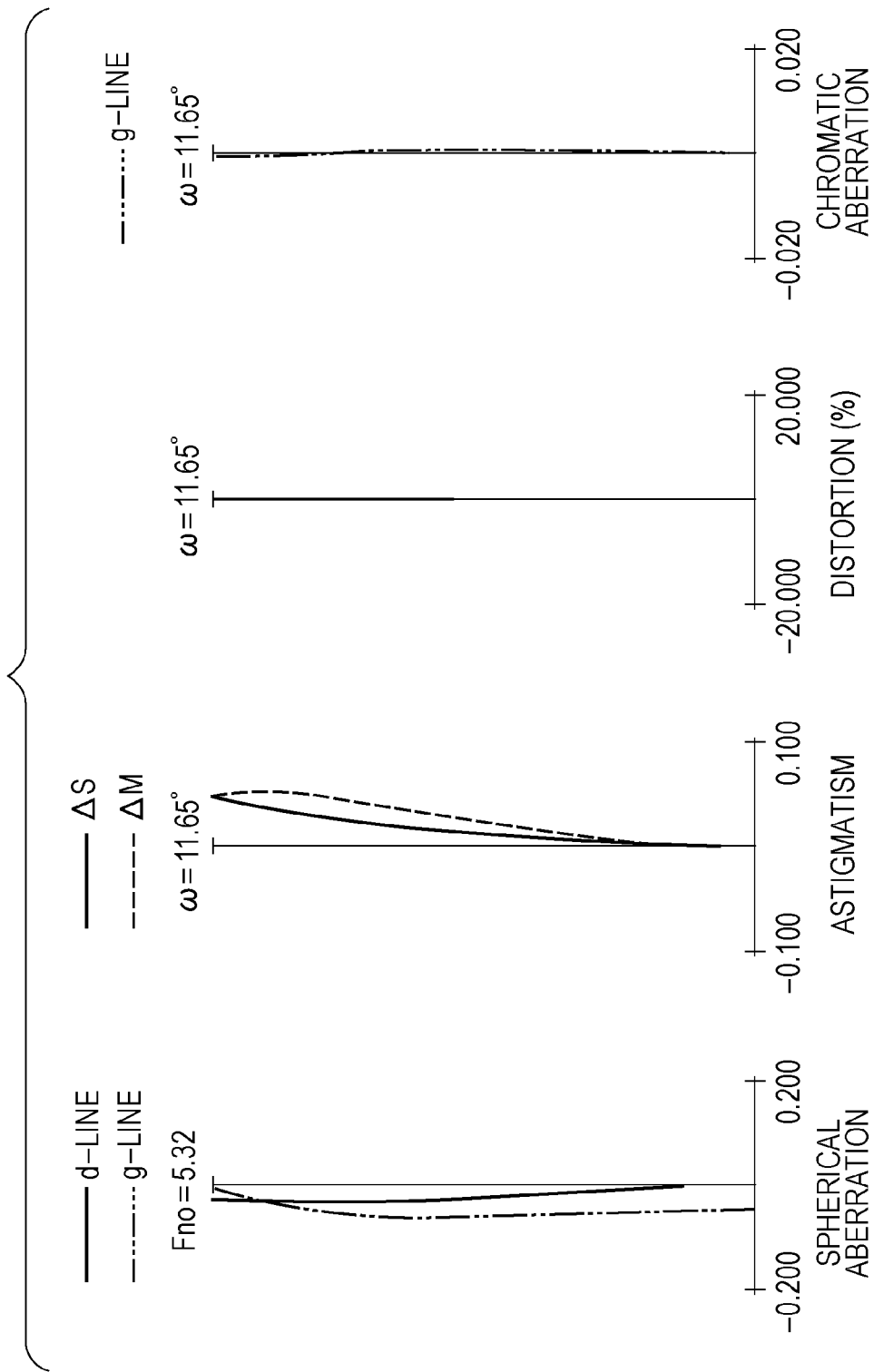

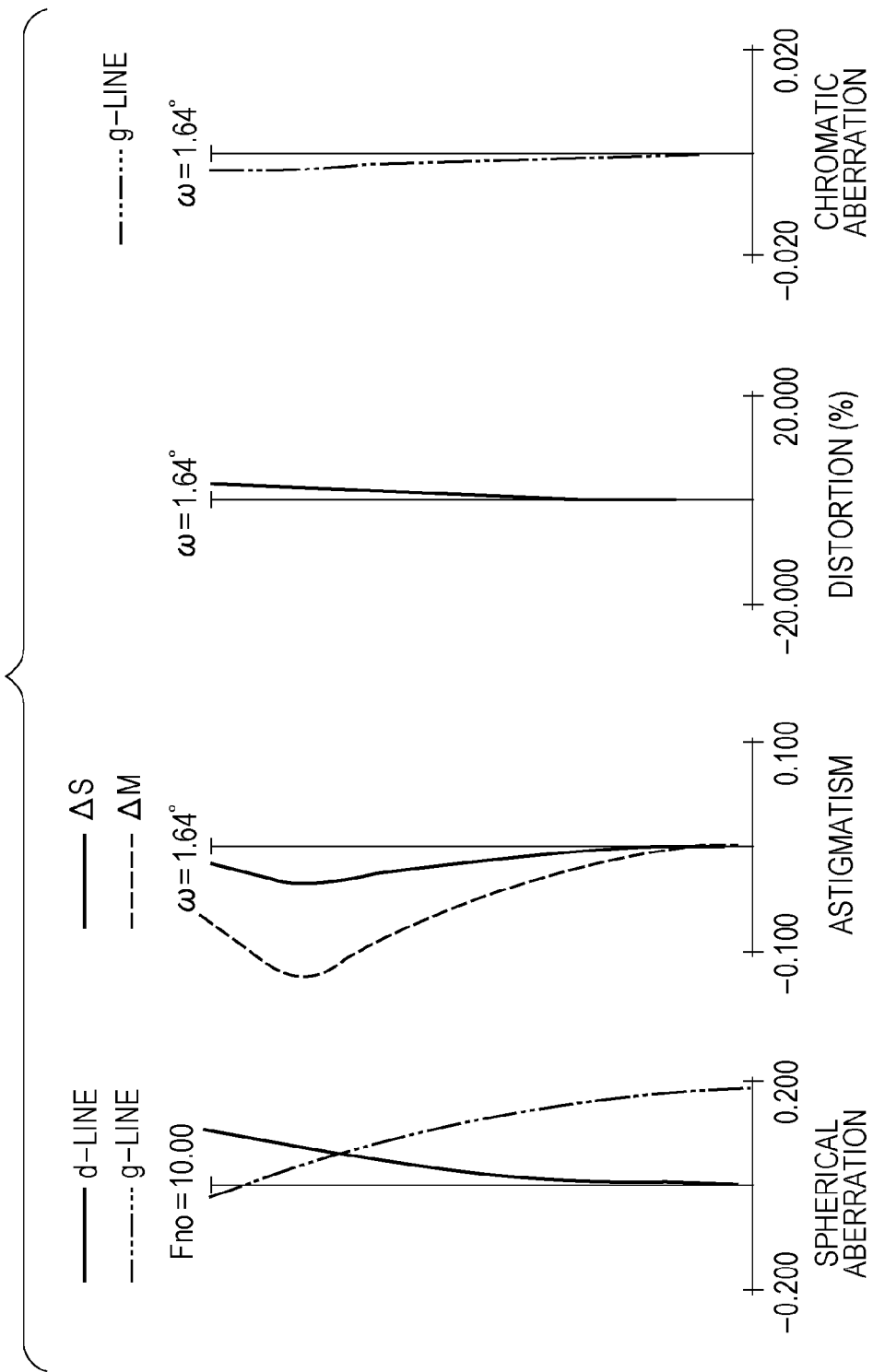

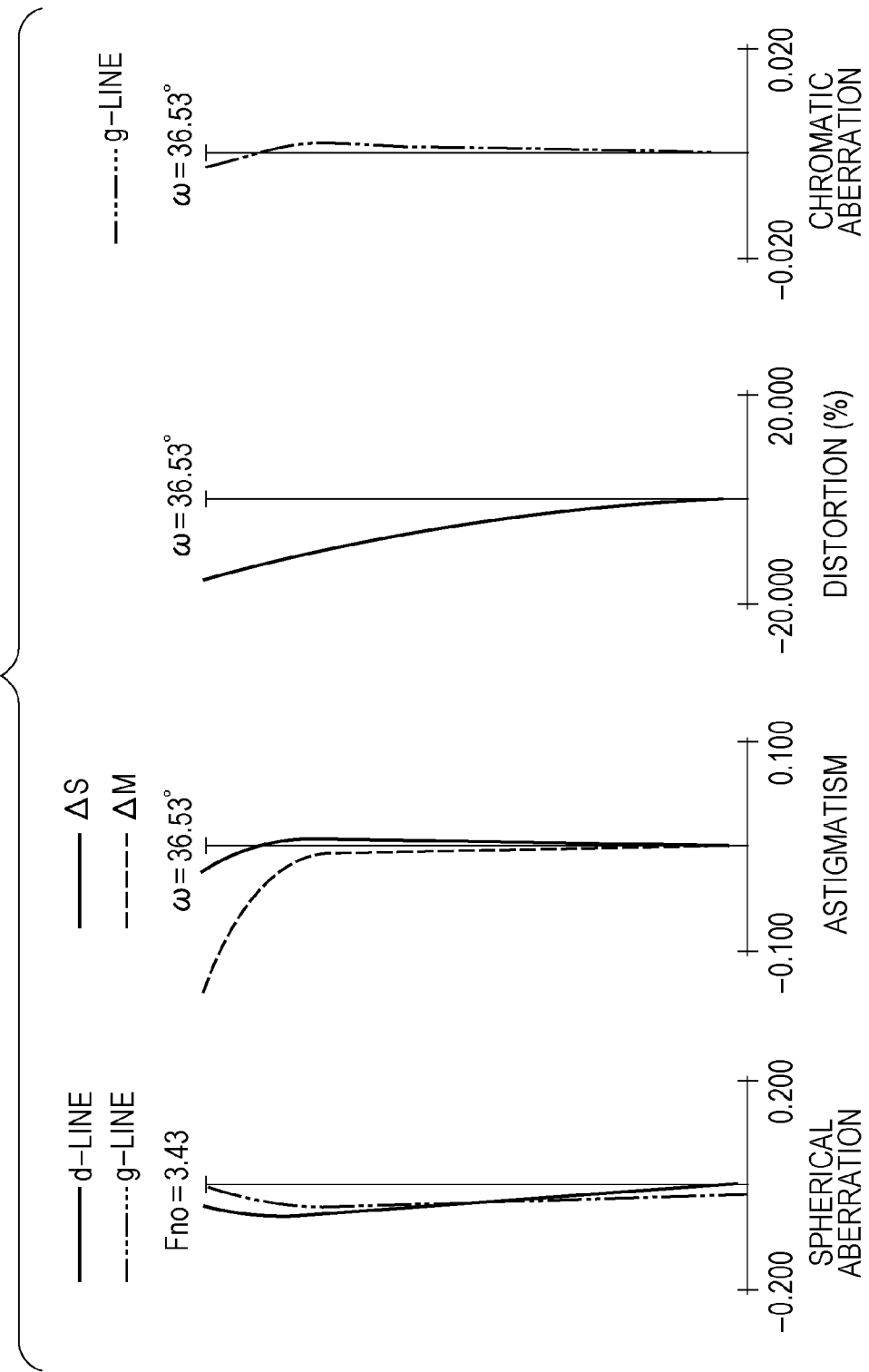

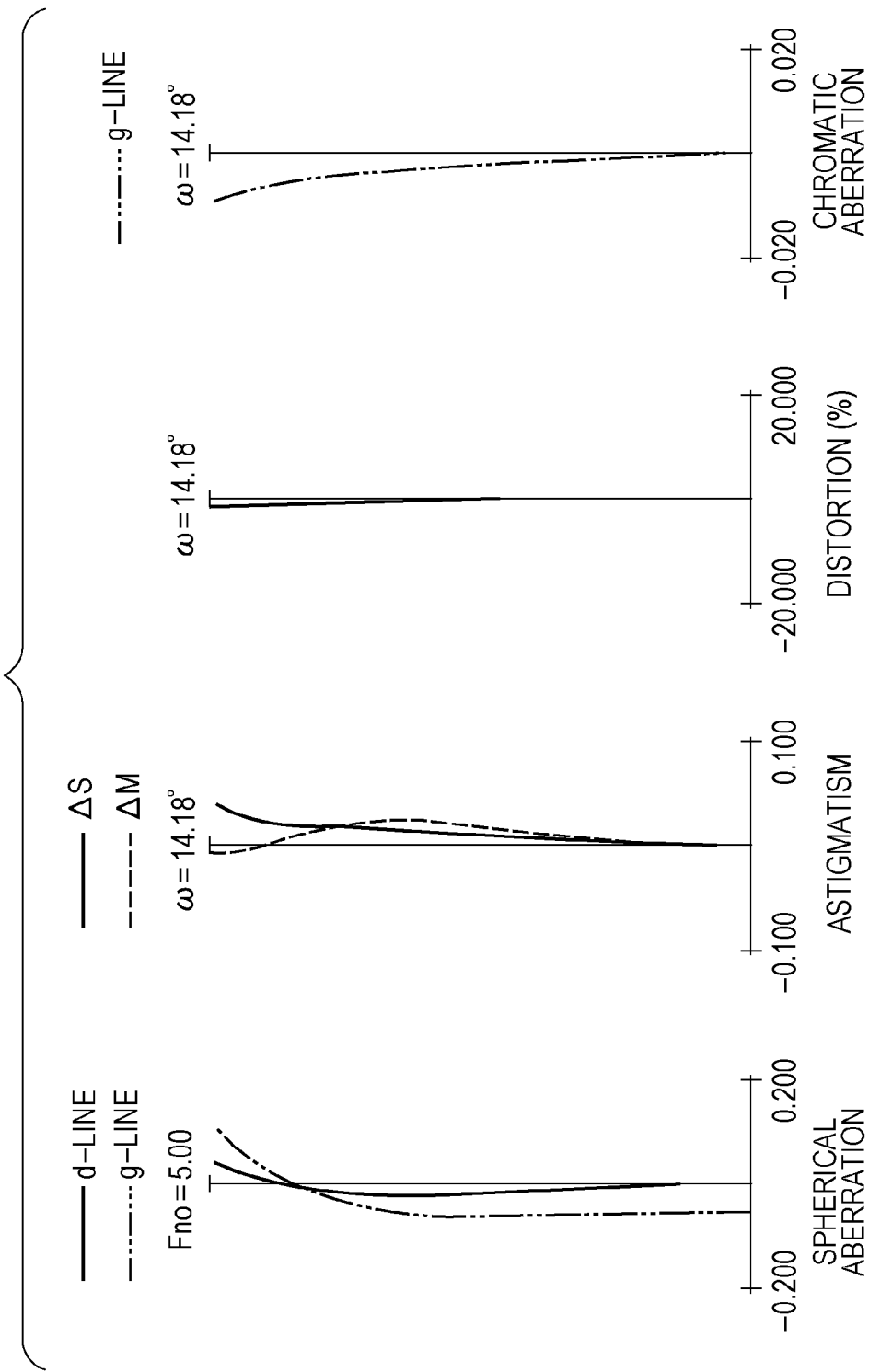

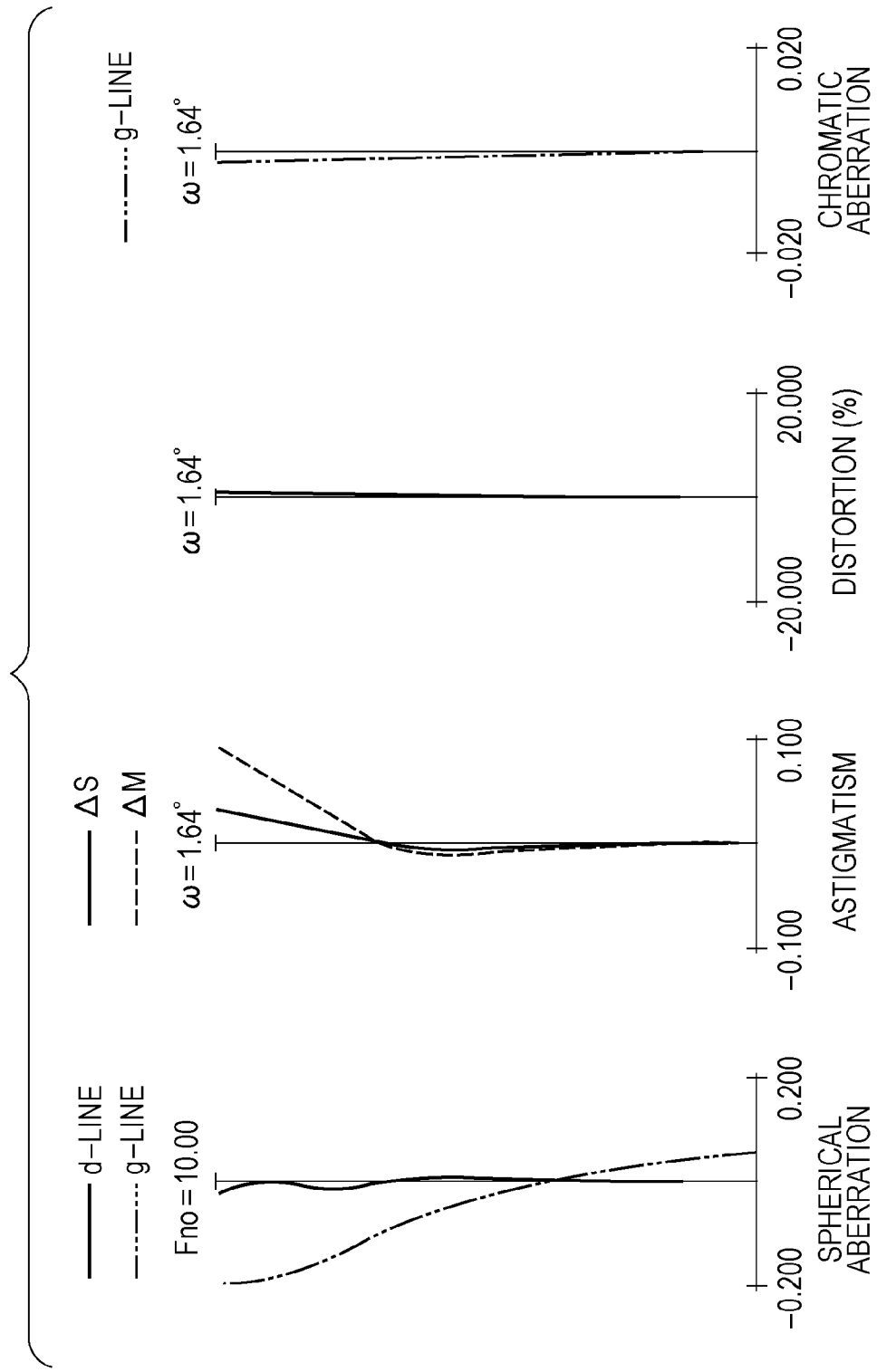

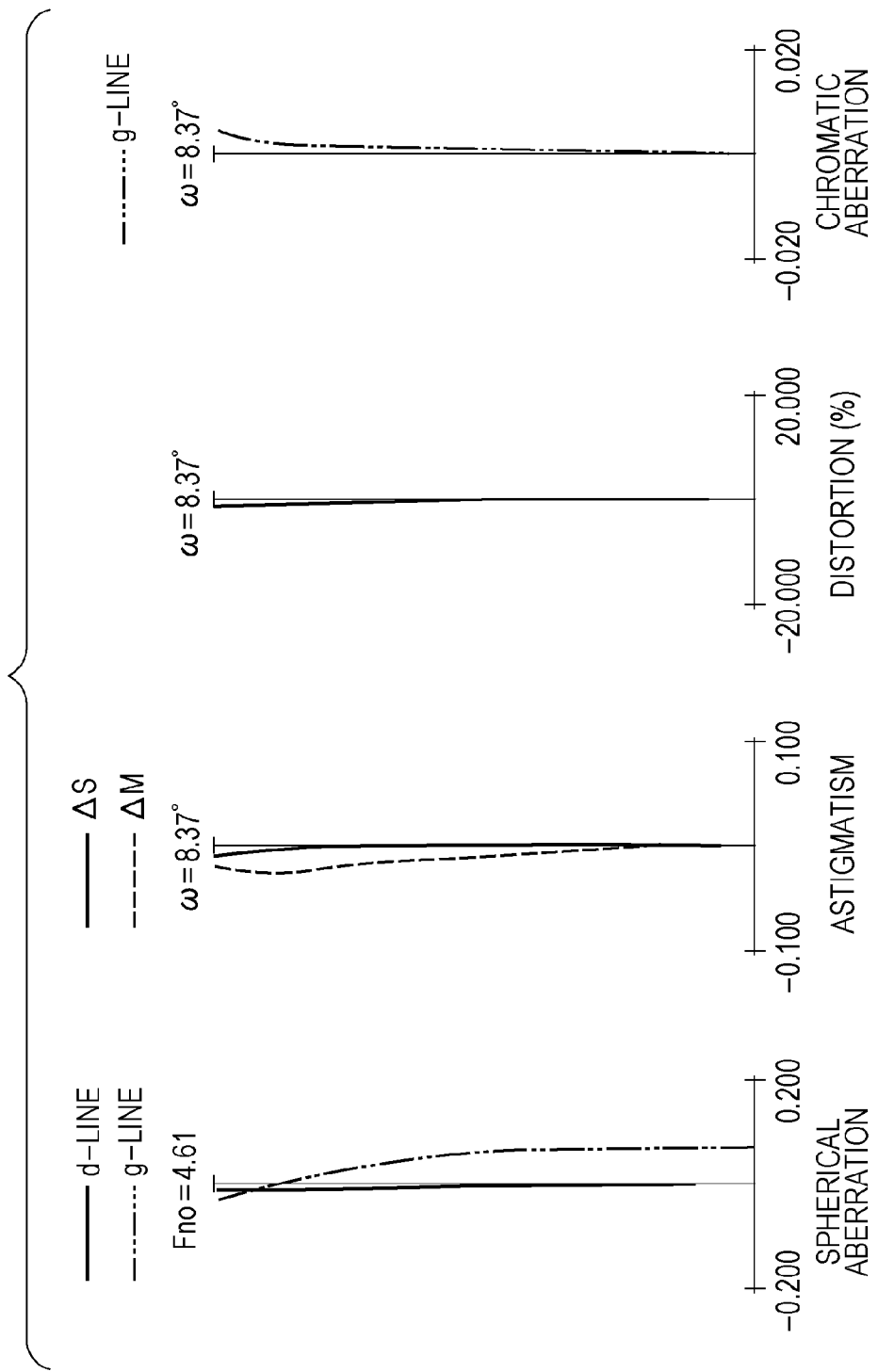

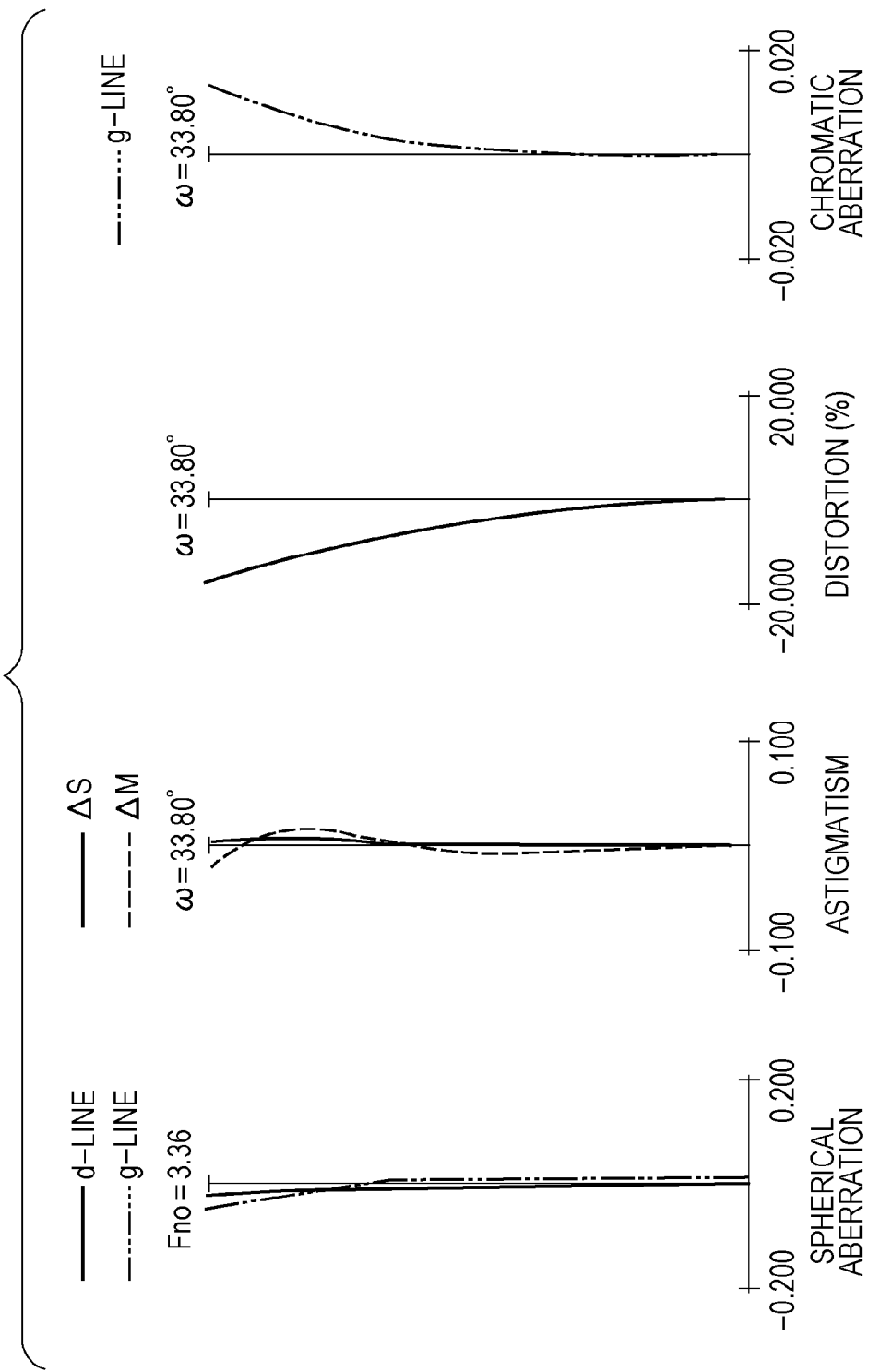

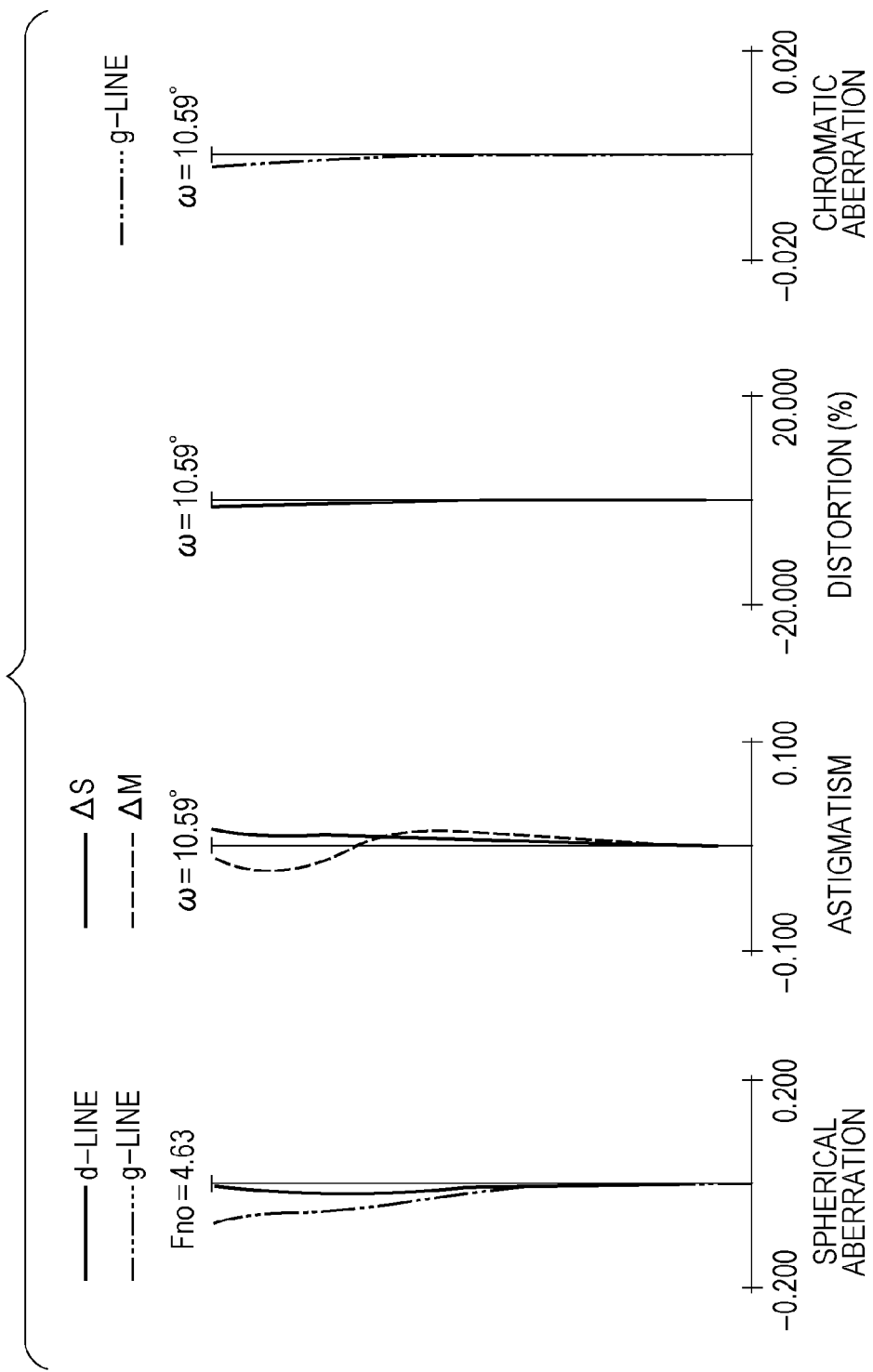

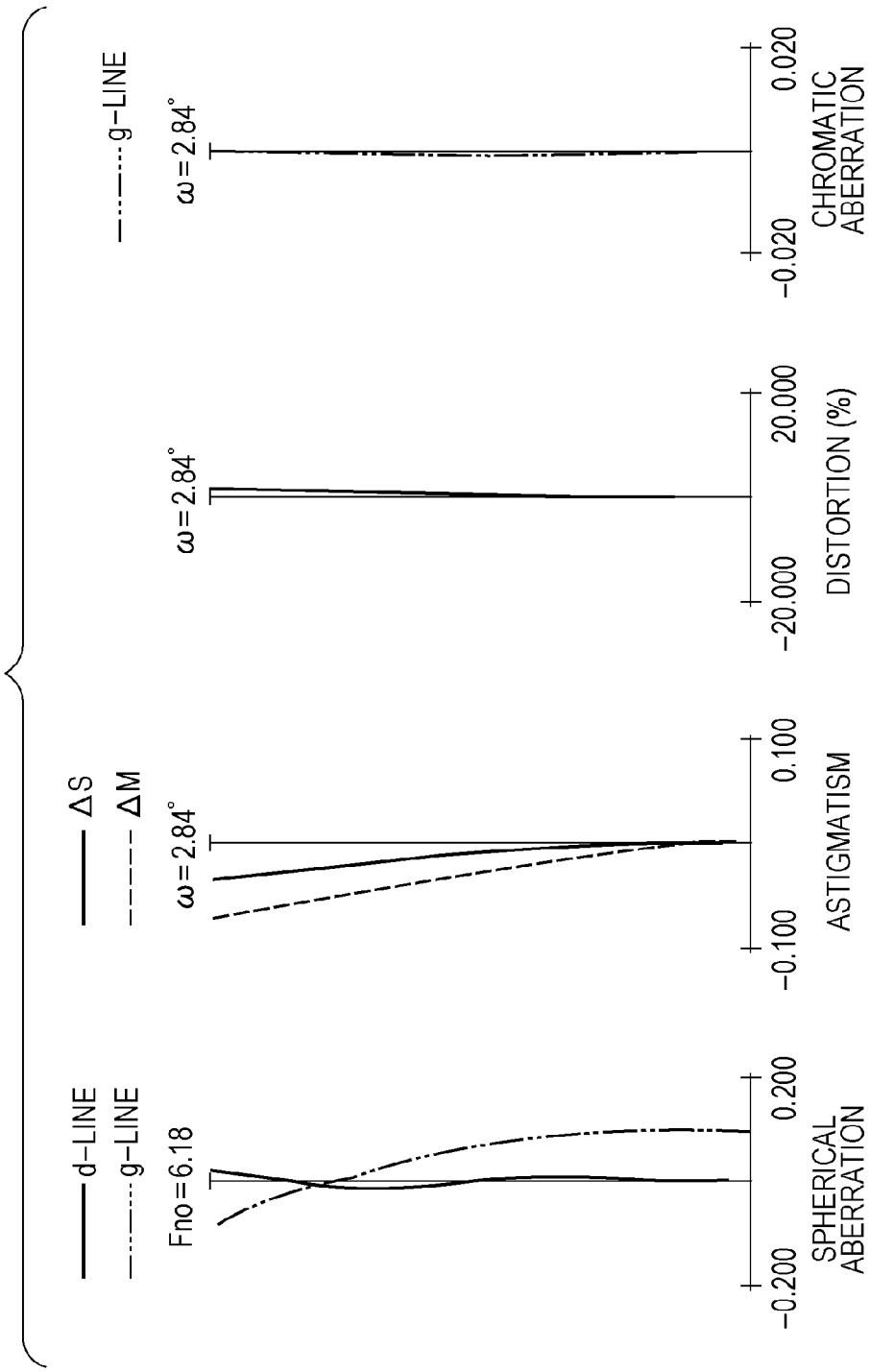

ZOOM LENS AND IMAGE PICKUP APPARATUS HAVING THE SAME

BACKGROUND OF THE INVENTION

1. Field of the Invention

The present invention is related to a zoom lens and an image pickup apparatus having the same. The zoom lens may be preferably used in an image pickup apparatus having an image pickup element, such as a digital still camera, video camera, monitoring camera, broadcasting camera, or the like, or a camera using silver-halide photography film, or the like.

2. Description of the Related Art

As of recent, image pickup apparatuses such as digital still cameras, video cameras, and so forth, which use solid state image pickup sensor-elements are highly functional and have reduced in overall size. Accordingly, there is demand for a zoom lens for use with these apparatuses. To meet the demands of these highly functional and small sized apparatus, a zoom lens should preferably have high power, a wide view angle, small size, and good optical performance over the entire zoom range. To this end, certain zoom lenses have already been proposed. Currently, there are known zoom lenses having lens units with positive, negative, and positive refractive power, as seen from the object side toward the image side, in that order.

However, as the functionality of image pickup apparatuses continues to improve, zoom lenses must follow such improvement. To that end, it is known that raising the power of a zoom lens increases the focal length at the telephoto end. However, occurrence of axial chromatic aberration becomes overly pronounced. Zoom lenses disclosed in Japanese Patent Laid-Open No. 2008-191291 and Japanese Patent Laid-Open No. 2008-191286 use anomalous dispersion glass for the material of a negative lens included in a first lens unit, as a technique to reduce axial chromatic aberration.

Generally, a small-sized and high-powered image pickup optical system can be obtained by increasing the refractive power of each lens making up the image pickup optical system while reducing the number of lenses making up each lens unit. However, increased refractive power of a lens unit increases the refractive power at the lens surface of the lenses making up the lens unit, resulting in a thicker lens to ensure a sufficient edge thickness for the lens. This results in a larger front lens diameter (effective diameter of the front lens), which makes realizing reduction in size of the optical system difficult. Also, increased focal length at the telephoto end results in pronounced chromatic aberration, which is difficult to correct.

SUMMARY OF THE INVENTION

In accordance with embodiments of the present invention, a zoom lens comprises, in order from an object side to an image side, a first lens unit having positive refractive power, a second lens unit having negative refractive power, and a rear lens group having a plurality of lens units at least one of which has positive refractive power. The distance between the first lens unit and the second lens unit is greater at a telephoto end as compared to at a wide angle end. The first lens unit includes a positive lens and a negative lens. The rear lens group includes a lens unit R comprising a positive lens and a negative lens; the lens unit R is a lens unit having the highest zoom ratio among the lens units included in the rear lens group. The Conditional Expressions $5.0 < \nu d1n < 27.0$ $5.0 < \nu dRn < 27.0$ $\theta gF1n < 2.381 \times 10^{-4} \cdot \nu d1n^2 - 1.448 \times 10^{-2} \cdot \nu d1n + 0.8223$ $\theta gFRn < 2.381 \times 10^{-4} \cdot \nu dRn^2 - 1.448 \times 10^{-2} \cdot \nu dRn + 0.8223$ $-0.00150 < (\theta gF1n - \theta gF1p)/(\nu d1n - \nu d1p)$ $-0.00150 < (\theta gFRn - \theta gFRp)/(\nu dRn - \nu dRp)$ are satisfied, where of the positive lenses included in the first lens unit, $\nu d1p$ represents the Abbe number of the material of the positive lens of which the Abbe number of the lens material is the greatest, and $\theta gF1p$ represents the partial dispersion ratio thereof, of the negative lenses included in the first lens unit, $\nu d1n$ represents the Abbe number of the material of the negative lens of which the Abbe number of the lens material is the smallest, and $\theta gF1n$ represents the partial dispersion ratio thereof, of the positive lenses included in the lens unit R, $\nu dRp$ represents the Abbe number of the material of the positive lens of which the Abbe number of the lens material is the greatest, and $\theta gFRp$ represents the partial dispersion ratio thereof, and of the negative lenses included in the lens unit R, $\nu dRn$ represents the Abbe number of the material of the negative lens of which the Abbe number of the lens material is the smallest, and $\theta gFRn$ represents the partial dispersion ratio thereof.

Further features of the present invention will become apparent from the following description of exemplary embodiments with reference to the attached drawings.

BRIEF DESCRIPTION OF THE DRAWINGS

FIG. 1 is a cross-sectional view of lenses at a wide-angle end of a zoom lens according to a first embodiment.

FIGS. 2A, 2B, and 2C are aberration diagrams of the zoom lens according to the first embodiment, at the wide angle end, an intermediate zoom position, and the telephoto end.

FIGS. 4A, 4B, and 4C are aberration diagrams of the zoom lens according to the second embodiment, at the wide angle end, an intermediate zoom position, and the telephoto end.

FIGS. 6A, 6B, and 6C are aberration diagrams of the zoom lens according to the third embodiment, at the wide angle end, an intermediate zoom position, and the telephoto end.

FIGS. 8A, 8B, and 8C are aberration diagrams of the zoom lens according to the fourth embodiment, at the wide angle end, an intermediate zoom position, and the telephoto end.

FIGS. 10A, 10B, and 10C are aberration diagrams of the zoom lens according to the fifth embodiment, at the wide angle end, an intermediate zoom position, and the telephoto end.

DESCRIPTION OF THE EMBODIMENTS

A zoom lens according to the present invention and an image pickup apparatus having the zoom lens will be described in detail with reference to the attached drawings. The zoom lens according to the present embodiment comprises, in order from the object side toward the image side, a first lens unit having positive refractive power, a second lens unit having negative refractive power, and a rear lens group including a plurality of lens units. Note that, as used herein, a lens unit may include one or more lenses, but does not have to include a plurality of lenses, as in certain embodiments a lens unit may include a single lens. The rear lens group also includes a plurality of lens units at least one of which having positive refractive power.

FIG. 1 is a cross-sectional view of lenses at a wide-angle end of a zoom lens according to a first embodiment. FIGS. 2A, 2B, and 2C are aberration diagrams of the zoom lens according to the first embodiment, at the wide angle end, an intermediate zoom position, and the telephoto end. The zoom ratio of the zoom lens according to the first embodiment is 29.13, and the aperture ratio is around 3.61 to 10.00.

Figure 3:
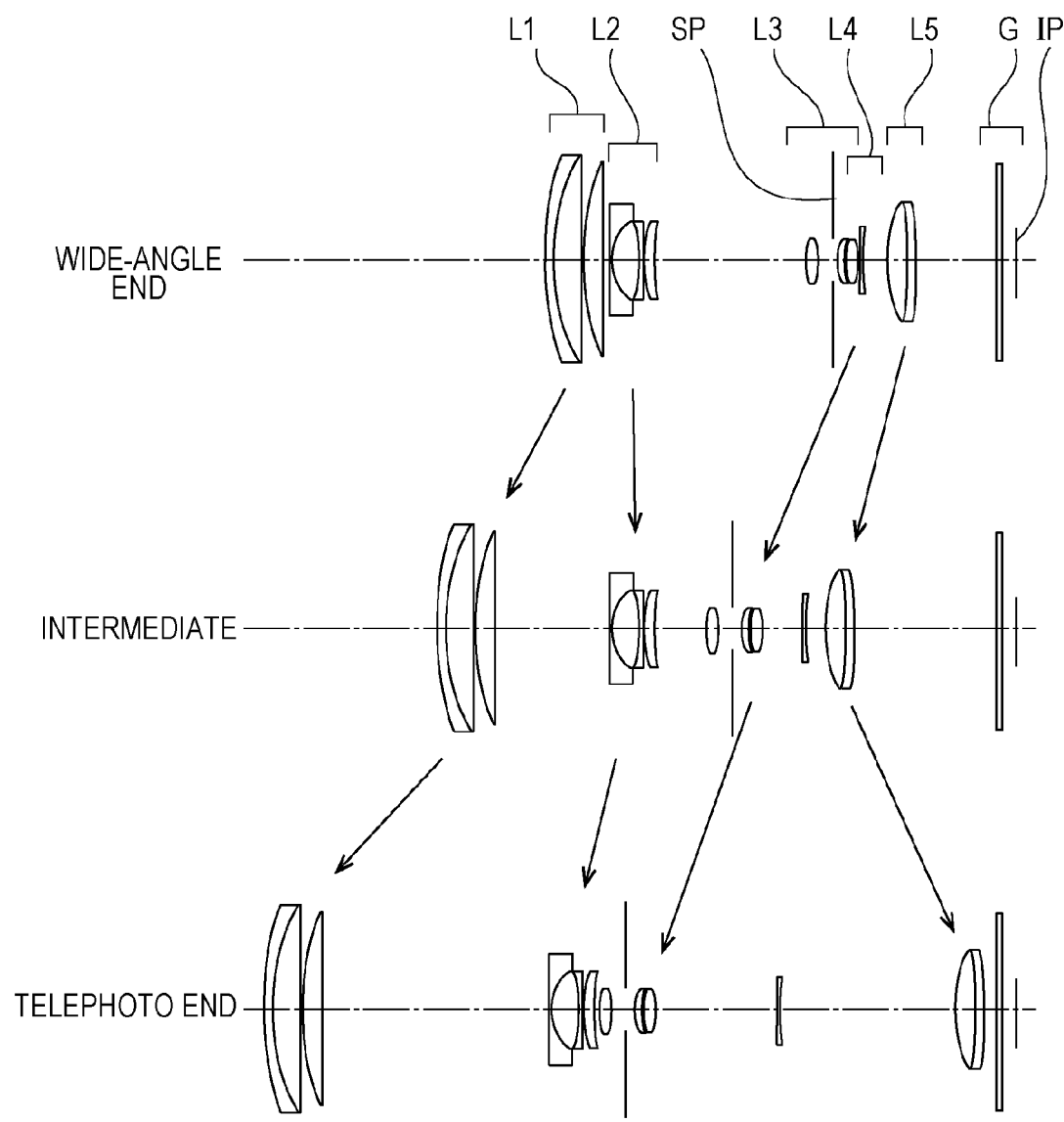
FIG. 3 is a cross-sectional view of lenses at a wide-angle end of a zoom lens according to a second embodiment.

FIG. 3 is a cross-sectional view of lenses at a wide-angle end of a zoom lens according to a second embodiment. FIGS. 4A, 4B, and 4C are aberration diagrams of the zoom lens according to the second embodiment, at the wide angle end, an intermediate zoom position, and the telephoto end. The zoom ratio of the zoom lens according to the second embodiment is 29.21, and the aperture ratio is around 3.57 to 10.00.

Figure 5:
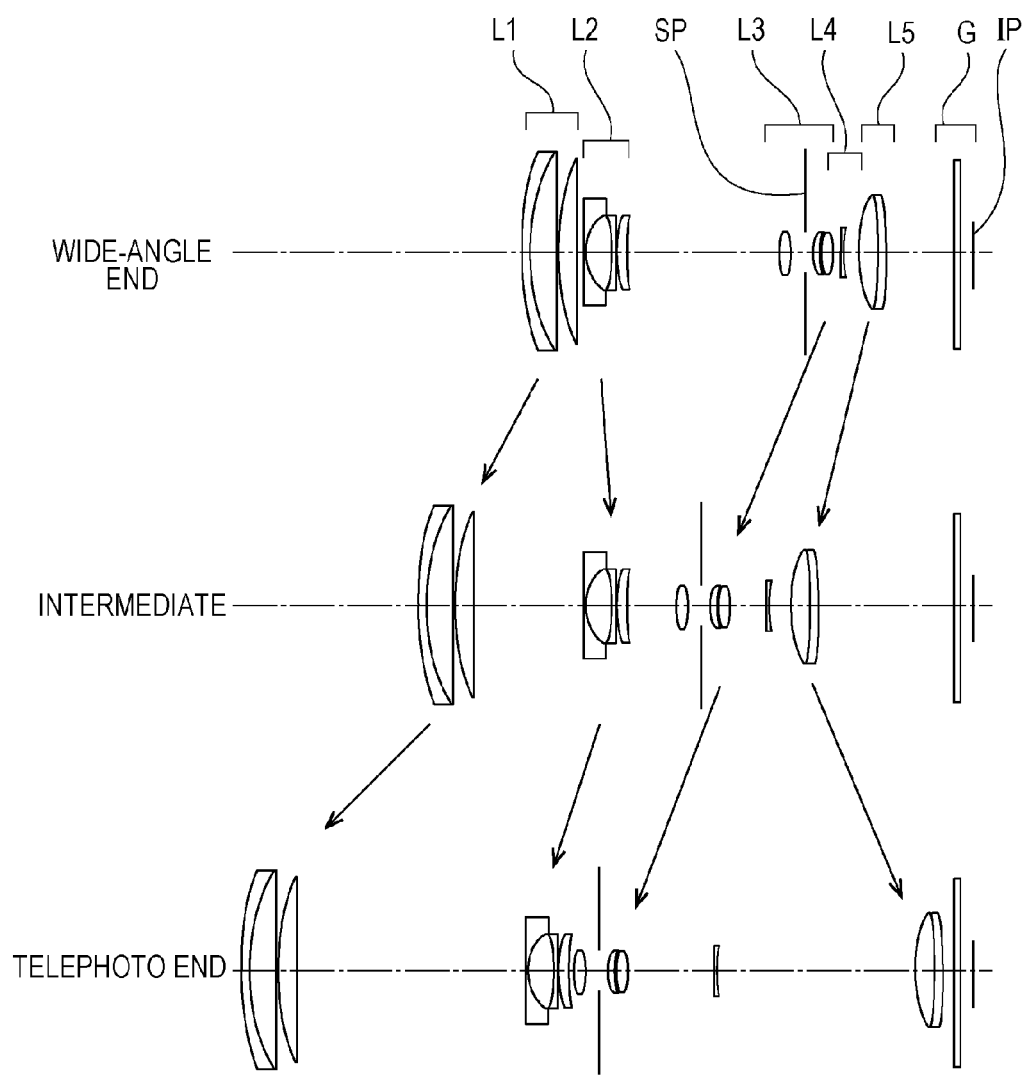
FIG. 5 is a cross-sectional view of lenses at a wide-angle end of a zoom lens according to a third embodiment.

FIG. 5 is a cross-sectional view of lenses at a wide-angle end of a zoom lens according to a third embodiment. FIGS. 6A, 6B, and 6C are aberration diagrams of the zoom lens according to the third embodiment, at the wide angle end, an intermediate zoom position, and the telephoto end. The zoom ratio of the zoom lens according to the third embodiment is 30.00, and the aperture ratio is around 3.43 to 10.00.

Figure 7:
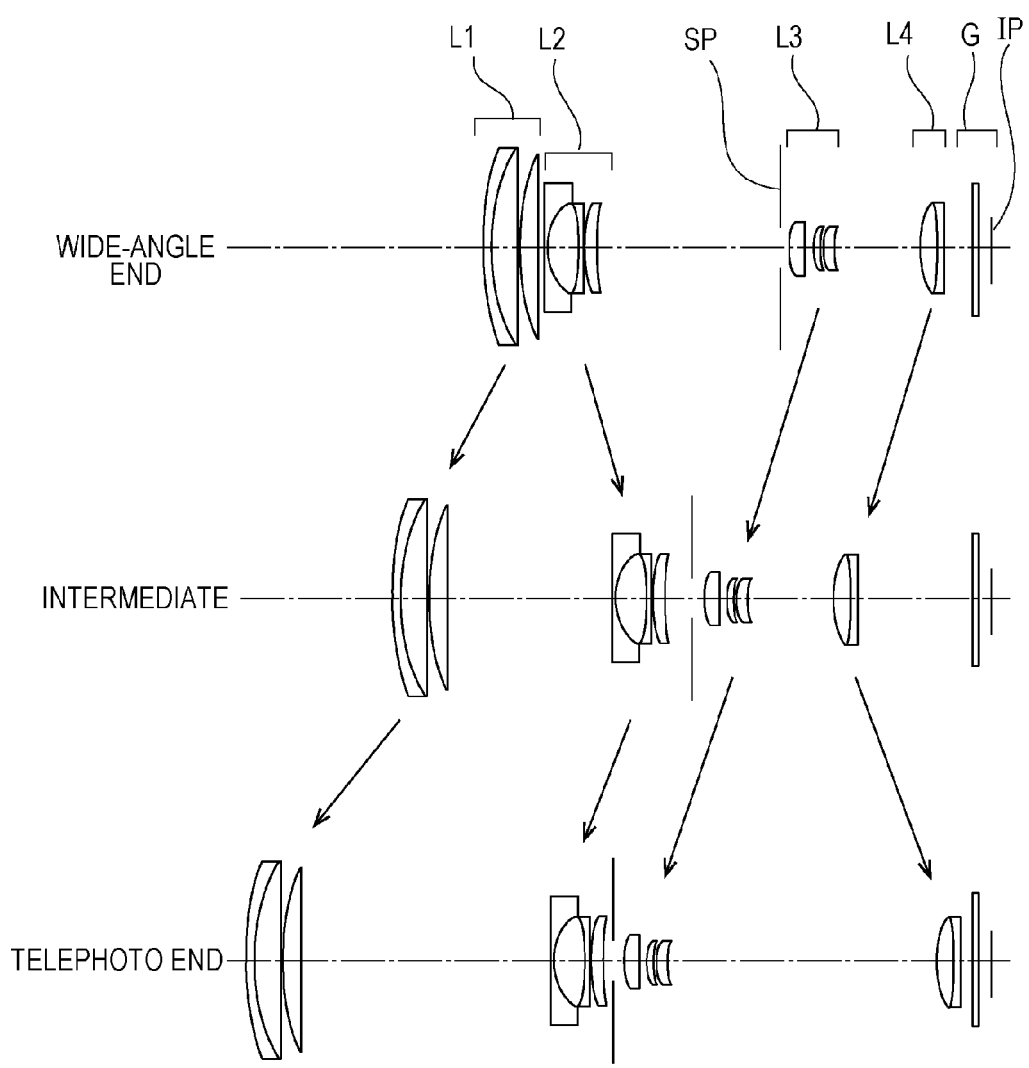
FIG. 7 is a cross-sectional view of lenses at a wide-angle end of a zoom lens according to a fourth embodiment.
Figure 8A:
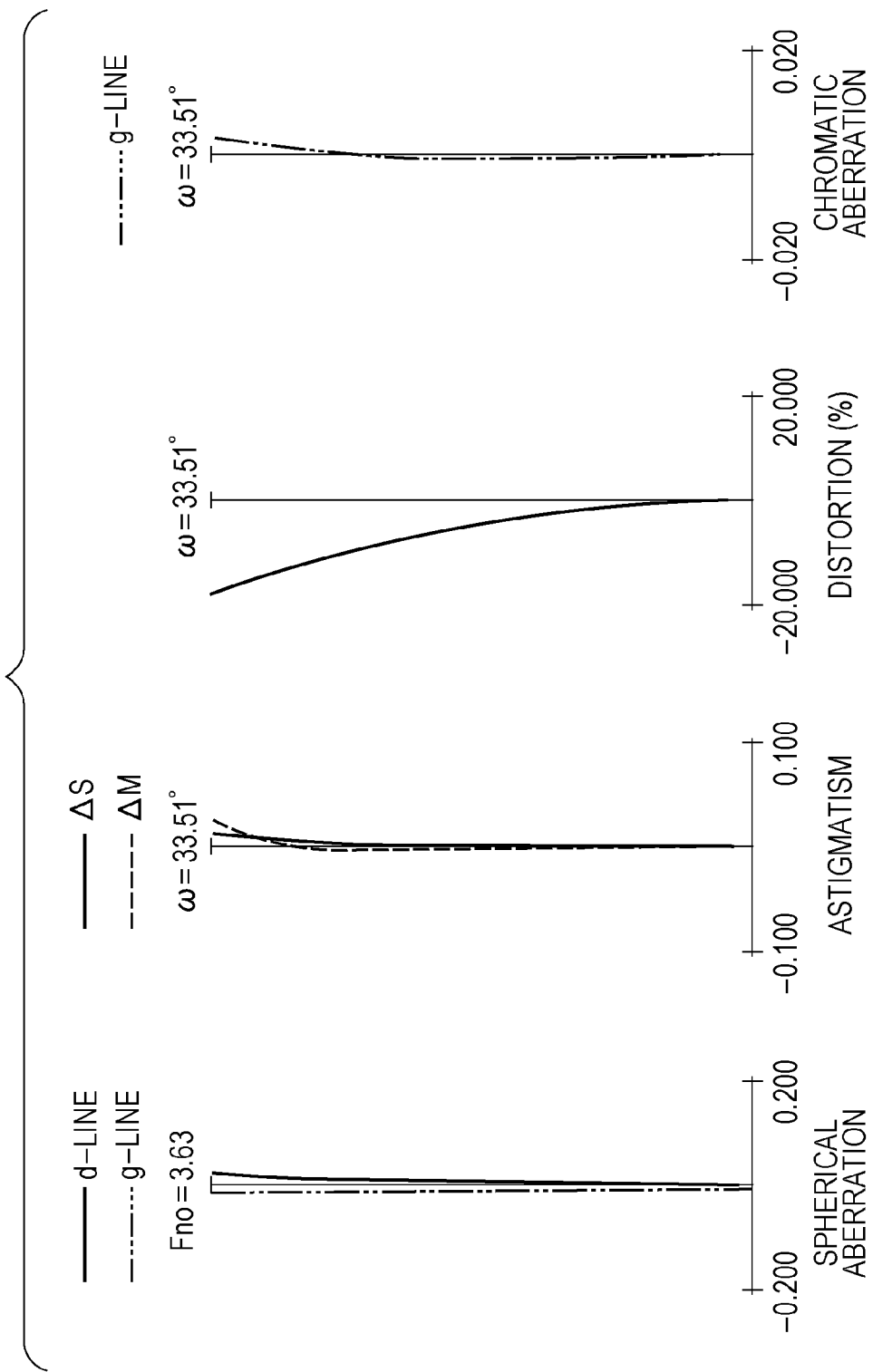
Figure 8C:
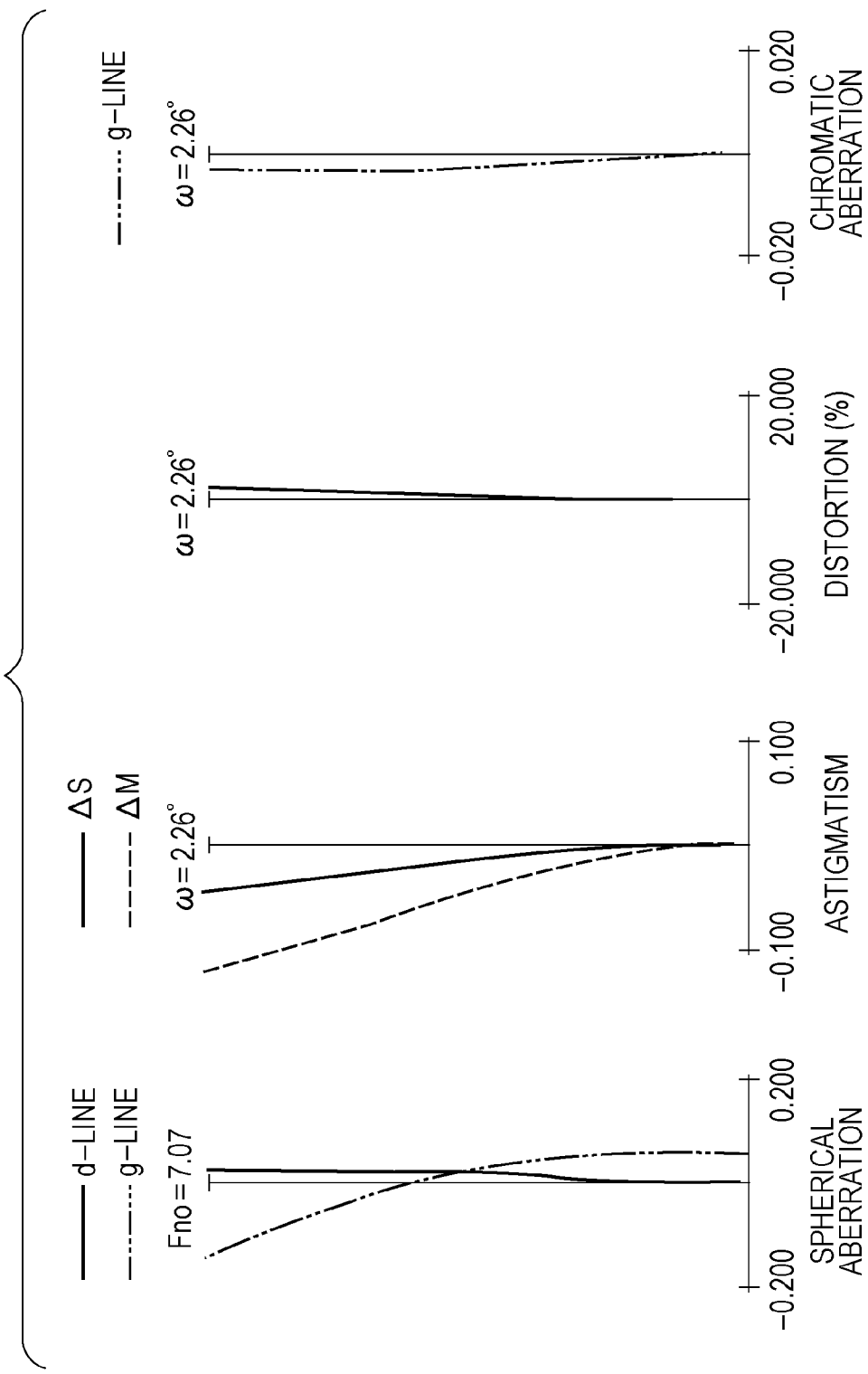

FIG. 7 is a cross-sectional view of lenses at a wide-angle end of a zoom lens according to a fourth embodiment. FIGS. 8A, 8B, and 8C are aberration diagrams of the zoom lens according to the fourth embodiment, at the wide angle end, an intermediate zoom position, and the telephoto end. The zoom ratio of the zoom lens according to the fourth embodiment is 19.03, and the aperture ratio is around 3.63 to 7.07.

Figure 9:
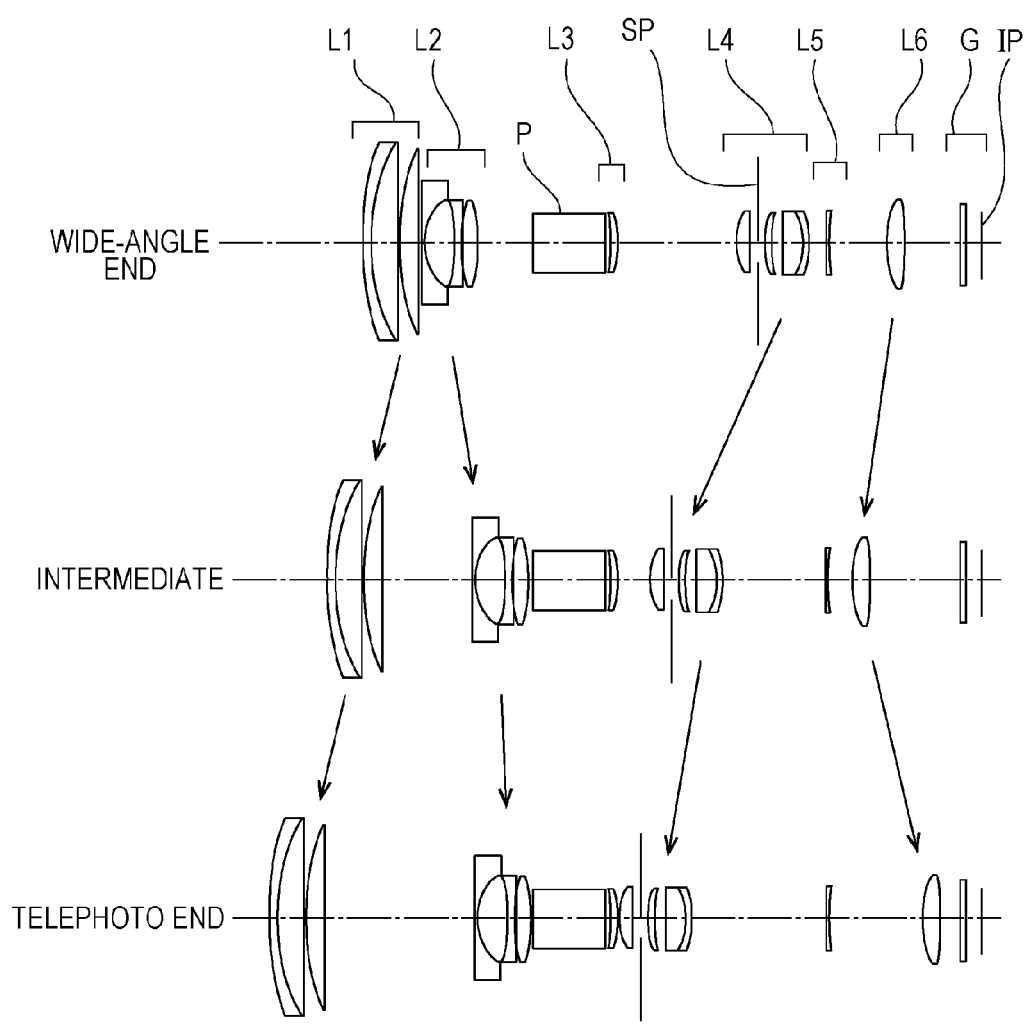
FIG. 9 is a cross-sectional view of lenses at a wide-angle end of a zoom lens according to a fifth embodiment.

FIG. 9 is a cross-sectional view of lenses at a wide-angle end of a zoom lens according to a fifth embodiment. FIGS. 10A, 10B, and 10C are aberration diagrams of the zoom lens according to the fifth embodiment, at the wide angle end, an intermediate zoom position, and the telephoto end. The zoom ratio of the zoom lens according to the fifth embodiment is 15.31, and the aperture ratio is around 3.36 to 6.18.

Figure 11:
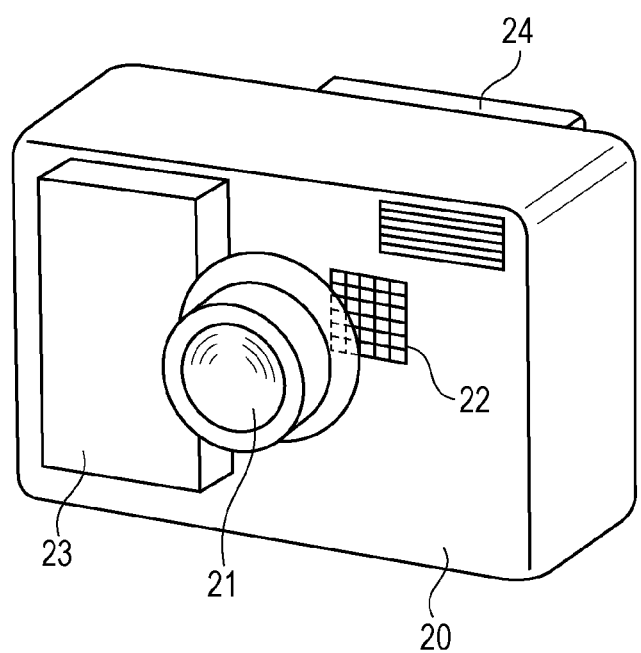
FIG. 11 is a schematic diagram of principal portions of an image pickup apparatus according to the present invention.
Figure 12:
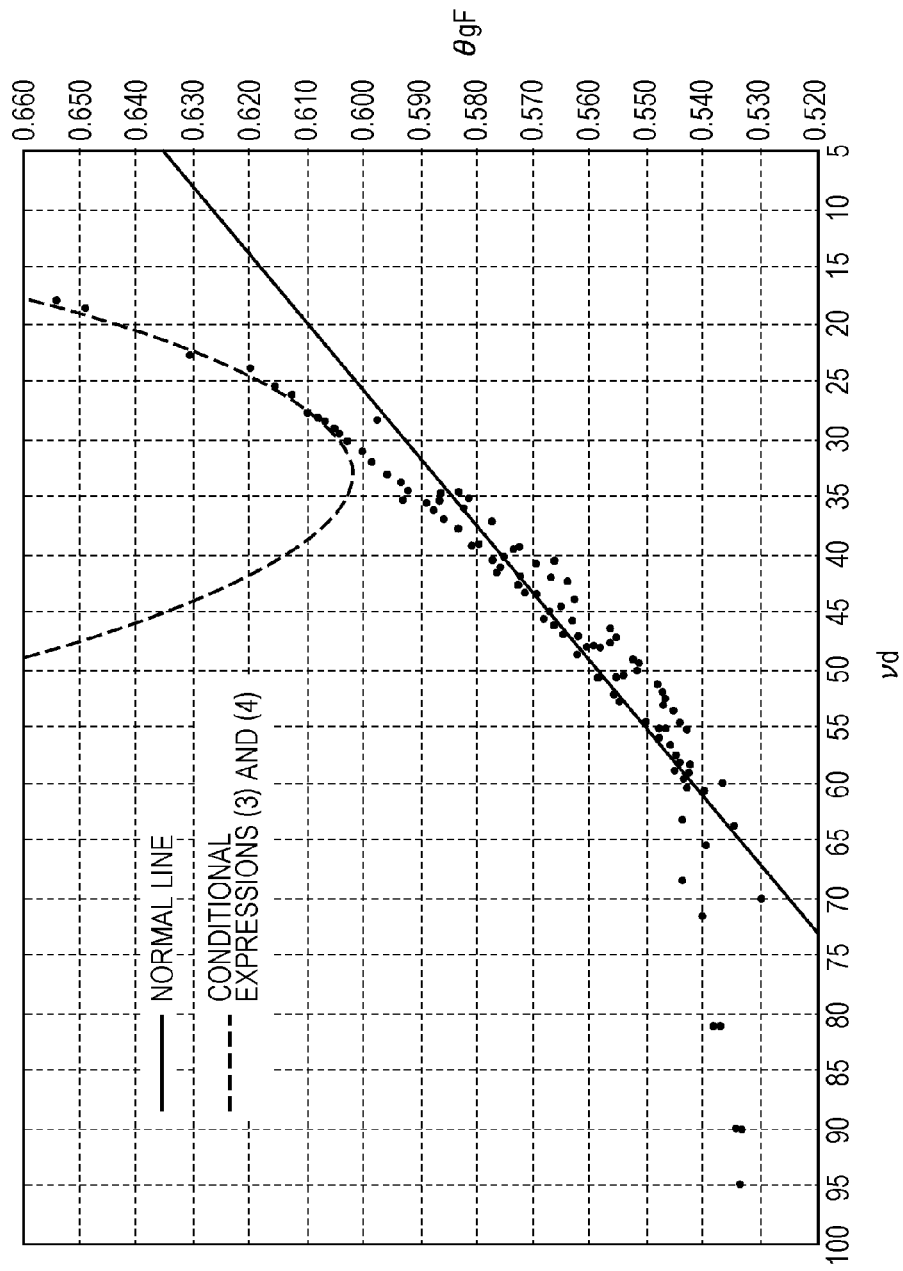
FIG. 12 is a diagram illustrating θgF-vd.

FIG. 11 is a schematic diagram of principal portions of a digital still camera (image pickup apparatus) having the zoom lens according to the present invention. FIG. 12 is a diagram illustrating θgF-vd. The zoom lens according to each embodiment is an image talking lens system used in image pickup apparatuses such as video cameras, digital still cameras, silver-halide film cameras, TV cameras, and so forth.

The zoom lenses according to the first through third embodiments comprise, in order from the object side to the image side, a first lens unit L1 having positive refractive power, a second lens unit L2 having negative refractive power, a third lens unit L3 having positive refractive power, a fourth lens unit L4 having negative refractive power, and a fifth lens unit L5 having positive refractive power. The first through third embodiments are positive lead type five-unit zoom lenses, including five lens units. In the first to third embodiments, the rear lens group comprising the third lens unit L3 having positive refractive power, the fourth lens unit L4 having negative refractive power, and the fifth lens unit L5 having positive refractive power.

The zoom lens according to the fourth embodiment comprises, in order from the object side to the image side, a first lens unit L1 having positive refractive power, a second lens unit L2 having negative refractive power, a third lens unit L3 having positive refractive power, and a fourth lens unit L4 having positive refractive power. The fourth embodiment is a positive lead type four-unit zoom lens, including four lens units. In the fourth embodiment, the rear unit comprising the third lens unit L3 having positive refractive power and the fourth lens unit L4 having positive refractive power.

The zoom lens according to the fifth embodiment comprises, in order from the object side to the image side, a first lens unit L1 having positive refractive power, a second lens unit L2 having negative refractive power, a third lens unit L3 having negative refractive power, a fourth lens unit L4 having positive refractive power, a fifth lens unit L5 having negative refractive power, and a sixth lens unit L6 having positive refractive power. The fifth embodiment is a positive lead type six-unit zoom lens, including six lens units. In the fifth embodiment, the rear lens group comprising the third lens unit L3 having negative refractive power, the fourth lens unit L4 having positive refractive power, the fifth lens unit L5 having negative refractive power, and the sixth lens unit L6 having positive refractive power. The zoom lens according to the fifth embodiment also includes a prism P which can bend the light path, interposed between the second lens unit L2 and third lens unit L3. The thickness of the image pickup apparatus can be reduced by a configuration enabling the zoom lens to be retracted.

In the embodiments, SP denotes an aperture diaphragm. In the first through third embodiments, the aperture diaphragm SP is located within the third lens unit L3. This enables the distance between the second lens unit L2 and third lens unit L3 at the telephoto end to be reduced, and increased power of the zoom lens can be realized. In the fourth embodiment, the aperture diaphragm SP is located between the second lens unit L2 and third lens unit L3, and moves integrally with the third lens unit L3 when zooming. This enables the mechanism to be simplified. In the fifth embodiment, the aperture diaphragm SP is located within the fourth lens unit L4. This enables the distance between the third lens unit L3 and fourth lens unit L4 at the telephoto end to be reduced, and increased power of the zoom lens can be realized.

G denotes an optical block equivalent to an optical filter, a face plate, a low-pass filter, an infrared cut filter, or the like. IP denotes the imaging plane. In a case of using the zoom lens as an image pickup optical system of a video camera or digital camera, the imaging plane IP is equivalent to a solid state image pickup element (photoelectric conversion element) such as a charge-coupled device (CCD) sensor or complementary metal-oxide semiconductor (CMOS) sensor or the like. In a case of using the zoom lens as an image pickup optical system of a silver-halide film camera, the imaging plane IP is equivalent to the film face.

In the spherical aberration diagrams, Fno is the F-number, representing spherical aberration as to the d-line (wavelength 587.6 nm) and g-line (wavelength 435.8 nm). In the astigmatic diagrams, ΔS represents the sagittal image plane, and ΔM represents the meridional image plane. The distortion is illustrated regarding the d-line. The chromatic aberration of magnification diagrams represent chromatic aberration of magnification at the g-line. ω represents the imaging half angle of view.

In the embodiments, lens units move at the time of zooming from the wide angle end to the telephoto end, so the distances between adjacent lens units change.

Specifically, in the first through third embodiments, at the telephoto end, the distance between the first lens unit L1 and the second lens unit L2 is greater as compared to the wide angle end, and the distance between the second lens unit L2 and the third lens unit L3 is smaller. The distance between the third lens unit L3 and the fourth lens unit L4 is greater at the telephoto end than at the wide-angle end; and the distance between the fourth lens unit L4 and fifth lens unit L5 is greater at the telephoto end than at the wide-angle end. At the telephoto end, the first lens unit L1, third lens unit L3, and fourth lens unit L4 are situated closer to the object side as compared to at the wide angle end. The second lens unit L2 moves towards the object side by following a locus convex to the image side at the time of zooming from the wide angle end to the telephoto end. That is, as shown in FIGS. 1, 3 and 5, when zooming from the wide-angle end to the intermediate zoom position, the second lens unit L2 first moves slightly towards the image side, but when zooming from the intermediate position to the telephone end the second lens unit L2 moves towards the object side. Therefore, the second lens unit L2 traces a convex locus (convexity being to the image side). The fifth lens unit L5 moves towards the image side following a locus convex to the object side at the time of zooming from the wide angle end to the telephoto end.

In the fourth embodiment, at the telephoto end, the distance between the first lens unit L1 and second lens unit L2 is greater as compared to the wide angle end, the distance between the second lens unit L2 and the third lens unit L3 is smaller, and the distance between the third lens unit L3 and the fourth lens unit L4 is greater. At the telephoto end, the first lens unit L1 and third lens unit L3 are situated closer to the object side as compared to the wide angle end. The second lens unit L2 moves following a convex locus to the image side at the time of zooming from the wide angle end to the telephoto end. The fourth lens unit L4 moves following a convex locus to the object side at the time of zooming from the wide angle end to the telephoto end.

In the fifth embodiment, at the telephoto end, the distance between the first lens unit L1 and the second lens unit L2 is greater as compared to the wide angle end, and the distance between the second lens unit L2 and the third lens unit L3 is smaller. The distance between the third lens unit L3 and the fourth lens unit L4 is smaller, the distance between the fourth lens unit L4 and fifth lens unit L5 is greater, and the distance between the fifth lens unit L5 and the sixth lens unit L6 is greater. At the telephoto end, the first lens unit L1 and fourth lens unit L4 are situated closer to the object side as compared to the wide angle end, and the second lens unit L2 is closer to the image side. The sixth lens unit L6 moves following a convex locus to the object side at the time of zooming from the wide angle end to the telephoto end. The third lens unit L3 and fifth lens unit L5 are stationary when zooming.

In the embodiments, the share of the zooming ratio is raised for the lens units located on the image side of the aperture diaphragm SP, thereby reducing the zooming ratio for the lens units located on the object side of the aperture diaphragm SP. Accordingly, the amount of movement of the first lens unit L1 toward the object side when zooming can be reduced, and the overall lens length at the telephoto end can be reduced.

The embodiments use lenses using material having anomalous dispersion to reduce chromatic aberration. The following is a description of a method to reduce chromatic aberration using material having anomalous dispersion.

FIG. 12 is a graph showing the relationship of partial dispersion versus the Abbe number in common optical glass as compared to materials that meet the conditions disclosed in this application. In the graph, the vertical axis is partial dispersion ratio θgF, with increasing in value upwards, and the horizontal axis is the Abbe number, increasing toward the left (hereinafter referred to as a "θgF-vd diagram"). It is known that mapping a material on this θgF-vd diagram yields a distribution along a straight line called a normal line. In the present invention, the normal line is represented by the following Expression.

$$\theta gF = -0.001682 \times vd + 0.6438$$

Now, the Abbe number vd, and the partial dispersion ratio θgF are numerical values represented by $$vd = (Nd-1)/(NF-NC)$$

$$\theta gF = (Ng-NF)/(NF-NC)$$

where Ng, NF, NC, and Nd respectively represent the refractive index of the material as determined with respect to the Fraunhofer g-line (wavelength 435.8 nm), F-line (486.1 nm), C-line (656.3 nm), and d-line (587.6 nm).

In positive lead type zoom lenses, the marginal ray of the axial ray passes through a relatively high position at the first lens unit L1 and at a lens unit R (lens unit having the highest zoom ratio of the lens units having positive refractive power, excluding the first lens unit L1 and second lens unit L2). The zoom ratio is obtained by dividing the lateral magnification at the telephoto end by the lateral magnification at the wide angle end. Accordingly, axial chromatic aberration and spherical aberration readily occur at the first lens unit L1 and lens unit R. Correcting spherical aberration at a plurality of frequencies at the telephoto end results in greater axial chromatic aberration, so the secondary spectra of axial chromatic aberration is preferably made as small as possible. The third lens unit L3 is the lens unit R in the first through fourth embodiments, and the fourth lens unit L4 is the lens unit R in the fifth embodiment, as illustrated here in Table 1. That is, in the rear lens group, the lens unit R is a lens unit having the highest zoom ratio of the lens units having positive refractive power.

TABLE 1

|  | FIRST EMBODIMENT | SECOND EMBODIMENT | THIRD EMBODIMENT | FOURTH EMBODIMENT | FIFTH EMBODIMENT |
|---|---|---|---|---|---|
| ZOOM RATIO (L3) | 2.27 | 2.41 | 2.67 | 2.68 | 0.94 |
| ZOOM RATIO | 0.97 | 0.84 | 0.65 | 1.11 | 2.19 |

TABLE 1-continued

| | FIRST EMBODIMENT | SECOND EMBODIMENT | THIRD EMBODIMENT | FOURTH EMBODIMENT | FIFTH EMBODIMENT |
|---|---|---|---|---|---|
| (L4) ZOOM RATIO (L5) | 1.91 | 2.11 | 2.54 | — | 0.87 |
| ZOOM RATIO (L6) | — | — | — | — | 1.42 |

In order to reduce the secondary spectra of axial color aberration at the first lens unit L1 and lens unit R, it is necessary to reduce the inclination of the straight line connecting the positive lens and negative lens glass material, from which the first lens unit L1 and lens unit R are formed, in the θgF-vd diagram.

For example, a material such as fluorite is preferably used as material for positive lenses included in the first lens unit L1 and lens unit R, since the Abbe number vd is great, and the material exists in the θgF-vd diagram in a region away from the normal line in a direction where the partial dispersion ratio θgF is great. Also, a lanthanum type glass material is preferably used as material for negative lenses included in the first lens unit L1 and lens unit R, since the material exists in the θgF-vd diagram in a region away from the normal line in a direction where the partial dispersion ratio θgF is small.

This combination places the inclination of the line connecting the glass material making up the positive lenses and negative lenses included in the first lens unit L1 and lens unit R below the normal line, so the secondary spectra of axial chromatic aberration can be corrected well. In this way, the material of the lenses included in the first lens unit L1 and lens unit R can be optimized, and thus the secondary spectra of axial chromatic aberration can be corrected well.

The embodiments satisfy the following Conditional Expressions (1) through (6).

$$5.0 < vd1n < 27.0 \quad (1)$$

$$5.0 < vdRn < 27.0 \quad (2)$$

$$\theta gF1n < 2.381 \times 10^{-4} \cdot vd1n^2 - 1.448 \times 10^{-2} \cdot vd1n + 0.8223 \quad (3)$$

$$\theta gFRn < 2.381 \times 10^{-4} \cdot vdRn^2 - 1.448 \times 10^{-2} \cdot vdRn + 0.8223 \quad (4)$$

$$-0.00150 < (\theta gF1n - \theta gF1p)/(vd1n - vd1p) < 0.00000 \quad (5)$$

$$-0.00150 < (\theta gFRn - \theta gFRp)/(vdRn - vdRp) < 0.00000 \quad (6)$$

In expressions (3) and (4) the dot symbol ("·") represents multiplication.

Here, of the positive lenses included in the first lens unit L1, vd1p represents the Abbe number of the material of the positive lens of which the Abbe number is the greatest, and θgF1p represents the partial dispersion ratio thereof. Also, of the negative lenses included in the first lens unit L1, vd1n represents the Abbe number of the material of the negative lens of which the Abbe number is the smallest, and θgF1n represents the partial dispersion ratio thereof. Of the positive lenses included in the lens unit R, vdRp represents the Abbe number of the material of the positive lens of which the Abbe number is the greatest, and θgFRp represents the partial dispersion ratio thereof. Also, of the negative lenses included in the lens unit R, vdRn represents the Abbe number of the material of the negative lens of which the Abbe number is the smallest, and θgFRn represents the partial dispersion ratio thereof.

In a case where, of the negative lenses included in the first lens unit L1, the Abbe number vd1n of the material of the negative lens of which the Abbe number is the smallest, exceeds the upper limit in the Conditional Expression (1), sufficiently correcting chromatic aberration may be difficult depending on the negative lens. The refractive power of the negative lens has to be increased to correct chromatic aberration, resulting in pronounced spherical aberration and comatic aberration over the entire zoom range, which is undesirable.

In a case where, of the negative lenses included in the first lens unit L1, the Abbe number vd1n of the material of the negative lens of which the Abbe number is the smallest, falls below the lower limit in the Conditional Expression (1), existing materials which satisfy the range of Conditional Expression (3) are restricted, which is undesirable.

In a case where, of the negative lenses included in the lens unit R, the Abbe number vdRn of the material of the negative lens of which the Abbe number is the smallest, exceeds the upper limit in the Conditional Expression (2), sufficiently correcting chromatic aberration may be difficult depending on the negative lens. The refractive power of the negative lens has to be increased to correct chromatic aberration, resulting in pronounced spherical aberration and comatic aberration over the entire zoom range, which is undesirable.

In a case where, of the negative lenses included in the lens unit R, the Abbe number vdRn of the material of the negative lens of which the Abbe number is the smallest, falls below the lower limit in the Conditional Expression (2), existing materials which satisfy the range of Conditional Expression (4) are restricted, which is undesirable.

In a case where, of the negative lenses included in the first lens unit L1, the partial dispersion ratio θgF1n of the negative lens of which the Abbe number is the smallest, exceeds the upper limit in the Conditional Expression (3), sufficient correction of secondary spectra of axial chromatic aberration at the telephoto side becomes difficult, which is undesirable.

In a case where, of the negative lenses included in the lens unit R, the partial dispersion ratio θgFRn of the negative lens of which the Abbe number is the smallest, exceeds the upper limit in the Conditional Expression (4), sufficient correction of secondary spectra of axial chromatic aberration at the telephoto side becomes difficult, which is undesirable.

Conditional Expression (5) stipulates the relationship between the difference in partial dispersion ratio of positive lenses and negative lenses included in the first lens unit L1, and the difference in Abbe numbers. In order to reduce the secondary spectral at the telephoto side, lens materials are preferably selected such that the difference in partial dispersion ratio of positive lenses and negative lenses included in the first lens unit L1 is small. Also, in order to sufficiently correct chromatic aberration, lens materials are preferably selected such that the difference between the Abbe number of positive lenses and the Abbe number of negative lenses included in the first lens unit L1 is great. Accordingly, the lens materials are preferably selected such that the numerical value of the Conditional Expression (5) approaches zero. In a case of exceeding the upper limit in Conditional Expression (5), the combinations of materials for the positive lenses and materials for the negative lenses which can be selected are limited, which is undesirable. In a case of falling below the lower limit in Conditional Expression (5), sufficient correction of secondary spectra of axial chromatic aberration becomes difficult, which is undesirable.

Conditional Expression (6) stipulates the relationship between the difference in partial dispersion ratio of positive lenses and negative lenses included in the lens unit R, and the difference in Abbe numbers. In order to reduce the secondary spectral at the telephoto side, lens materials are preferably selected such that the difference in partial dispersion ratio of positive lenses and negative lenses included in the lens unit R is small. Also, in order to sufficiently correct chromatic aberration, lens materials are preferably selected such that the difference between the Abbe number of positive lenses and the Abbe number of negative lenses included in the lens unit R is great. Accordingly, the lens materials are preferably selected such that the numerical value of the Conditional Expression (6) approaches zero. In a case of exceeding the upper limit in Conditional Expression (5), the combinations of materials for the positive lenses and materials for the negative lenses which can be selected are limited, which is undesirable. In a case of falling below the lower limit in Conditional Expression (6), sufficient correction of secondary spectra of axial chromatic aberration becomes difficult, which is undesirable.

The embodiments have the components thereof appropriately set so as to satisfy the Conditional Expressions (1) through (6) as described above. Accordingly, a zoom lens where chromatic aberration is suitably corrected can be obtained. Note that in the embodiments, the numerical ranges of the Conditional Expressions (1), (2), (5), and (6) are preferably set as follows.

$$15.0 < vd1n < 26.5 \tag{1a}$$

$$15.0 < vdRn < 26.5 \tag{2a}$$

$$-0.00140 < (\theta gF1n - \theta gF1p)/(vd1n - vd1p) < -0.00030 \tag{5a}$$

$$-0.00149 < (\theta gFRn - \theta gFRp)/(vdRn - vdRp) < -0.00050 \tag{6a}$$

Also further preferably, the numeric value ranges of Conditional Expressions (1), (2), (5), and (6) are set as follows.

$$17.0 < vd1n < 26.0 \tag{1b}$$

$$17.0 < vdRn < 26.0 \tag{2b}$$

$$-0.00130 < (\theta gF1n - \theta gF1p)/(vd1n - vd1p) < -0.00050 \tag{5b}$$

$$-0.00148 < (\theta gFRn - \theta gFRp)/(vdRn - vdRp) < -0.00060 \tag{6b}$$

Moreover, the embodiments preferably satisfy one or more of the following Conditional Expressions $$0.10 < f1/ft < 0.70 \tag{7}$$

$$-0.200 < f2/ft < -0.010 \tag{8}$$

$$0.020 < fR/ft < 0.300 \tag{9}$$

$$-4.00 < fn/f1 < -1.00 \tag{10}$$

$$-3.00 < fRn/fR < -1.00 \tag{11}$$

$$-10.00 < M1/fw < -1.00 \tag{12}$$

$$-4.00 < M2/fw < 3.00 \tag{13}$$

$$-8.00 < MR/fw < -1.00 \tag{14}$$

where f1 represents the focal length of the first lens unit L1, f2 represents the focal length of the second lens unit L2, fR represents the focal length of the lens unit R, fw represents the focal length of the entire system (entire zoom lens) at the wide angle end, and ft represents the focal length of the zoom lens at the telephoto end. Also, fin represents the focal length of the negative lens of which the Abbe number of the lens material is the smallest out of the negative lenses included in the first lens unit L1, and fRn represents the focal length of the negative lens of which the Abbe number of the lens material is the smallest out of the negative lenses included in the lens unit R. Further, M1 represents the amount of movement of the first lens unit L1 along the optical axis when zooming from the wide angle end to the telephoto end, and M2 represents the amount of movement of the second lens unit L2 along the optical axis when zooming from the wide angle end to the telephoto end, and MR represents the amount of movement of the lens unit R along the optical axis when zooming from the wide angle end to the telephoto end.

The term "amount of movement" here means the difference in position on the optical axis of each lens unit between the wide angle end and the telephoto end. The sign of the amount of movement is negative when located closer to the object side at the telephoto end as compared to at the wide angle end, and positive when located closer to the image side.

In a case where the focal length of the first lens unit L1 exceeds the upper limit in the Conditional Expression (7), the refractive power of the first lens unit L1 becomes weak, and thus the force to bend off-axis beams at the wide angle end is weaker. Consequently, the effective diameter of the first lens unit L1 increases, and reduction of the size of the lens system becomes difficult, which is undesirable.

In a case where the focal length of the first lens unit L1 falls below the lower limit in the Conditional Expression (7), the refractive power of the first lens unit L1 becomes strong. Consequently, occurrence of curvature of field, distortion aberration, and chromatic aberration of magnification becomes pronounced at the wide angle side, such that sufficient correction thereof is difficult, which is undesirable.

In a case where the focal length of the second lens unit L2 falls below the lower limit in the Conditional Expression (8), the refractive power of the second lens unit L2 becomes strong. Consequently, occurrence of curvature of field becomes pronounced at the wide angle side, and further occurrence of spherical aberration at the telephoto side becomes pronounced, such that sufficient correction thereof is difficult, which is undesirable.

In a case where the focal length of the second lens unit L2 exceeds the lower limit in the Conditional Expression (8), the refractive power of the second lens unit L2 becomes weak, and thus realizing high power becomes difficult, which is undesirable.

In a case where the focal length of the lens unit R exceeds the upper limit in the Conditional Expression (9), the refractive power of the lens unit R becomes weak, and thus realizing high power becomes difficult, which is undesirable.

In a case where the focal length of the lens unit R falls below the lower limit in the Conditional Expression (9), the refractive power of the lens unit R becomes strong. Consequently, occurrence of spherical aberration, comatic aberration, and axial chromatic aberration become pronounced, such that sufficient correction thereof is difficult, which is undesirable.

In a case where, of the negative lenses included in the first lens unit L1, the focal length fn of the negative lens of which the Abbe number of the lens material is the smallest is short exceeding the upper limit of the Conditional Expression (10), the refractive power of the negative lens becomes stronger. Consequently, occurrence of spherical aberration at the telephoto side is pronounced, which is undesirable.

In a case where, of the negative lenses included in the first lens unit L1, the focal length fn of the negative lens of which the Abbe number of the lens material is the smallest is long exceeding the lower limit of the Conditional Expression (10), the refractive power of the negative lens becomes weaker. Consequently, sufficient correction of chromatic aberration of the first lens unit L1 becomes difficult, which is undesirable.

In a case where, of the negative lenses included in the lens unit R, the focal length fRn of the negative lens of which the Abbe number of the lens material is the smallest is short exceeding the upper limit of the Conditional Expression (11), the refractive power of the negative lens becomes stronger. Consequently, occurrence of comatic aberration over the entire zoom range is pronounced, which is undesirable.

In a case where, of the negative lenses included in the lens unit R, the focal length fRn of the negative lens of which the Abbe number of the lens material is the smallest is long exceeding the lower limit of the Conditional Expression (11), the refractive power of the negative lens becomes weaker. Consequently, sufficient correction of chromatic aberration of the lens unit R becomes difficult, which is undesirable.

In a case where the amount of movement M1 of the first lens unit L1 is small exceeding the upper limit of the Conditional Expression (12), the refractive power of the first lens unit L1 has to be increased to realize high power. Consequently, occurrence of spherical aberration at the telephoto side is pronounced, which is undesirable. In a case where the amount of movement M1 of the first lens unit L1 is great exceeding the lower limit of the Conditional Expression (12), the overall lens length increases, which is undesirable.

In a case where the amount of movement M2 of the second lens unit L2 toward the image side is great exceeding the upper limit of the Conditional Expression (13), the amount of movement of the third lens unit L3 toward the object side becomes smaller. Consequently, the zooming capability of the third lens unit L3 becomes smaller, and realizing high power becomes difficult, which is undesirable.

In a case where the amount of movement M2 of the second lens unit L2 toward the object side is great exceeding the lower limit of the Conditional Expression (13), the amount of movement of the first lens unit L1 toward the object side also increases, so the overall lens length increases, which is undesirable.

In a case where the amount of movement MR of the lens unit R toward the image side is small exceeding the upper limit of the Conditional Expression (14), the zooming capability of the lens unit R becomes smaller, and realizing high power becomes difficult, which is undesirable. In a case where the amount of movement MR of the lens unit R toward the object side is great exceeding the lower limit of the Conditional Expression (14), the amount of movement of the aperture diaphragm SP which moves integrally with the lens unit R also becomes great. Accordingly, change in the F-number due to zooming becomes great, and the F-number is at a dark stop at the telephoto side, which is undesirable.

Preferably, setting the numerical ranges of the Conditional Expressions (7) through (14) to the following allows the maximum advantages of the Conditional Expressions to be yielded.

$$0.15 < f1/ft < 0.60 \tag{7a}$$

$$-0.150 < f2/ft < -0.020 \tag{8a}$$

$$0.040 < fR/ft < 0.280 \tag{9a}$$

$$-3.50 < f1n/f1 < -1.20 \tag{10a}$$

$$-2.50 < fRn/fR < -1.10 \tag{11a}$$

$$-9.00 < M1/fw < -1.50 \tag{12a}$$

$$-3.00 < M2/fw < 2.00 \tag{13a}$$

$$-7.00 < MR/fw < -1.50 \tag{14a}$$

Even more preferably, the numerical ranges of the Conditional Expressions (7) through (14) are set to the following.

$$0.20 < f1/ft < 0.50 \tag{7b}$$

$$-0.100 < f2/ft < -0.030 \tag{8b}$$

$$0.060 < fR/ft < 0.250 \tag{9b}$$

$$-3.00 < f1n/f1 < -1.40 \tag{10b}$$

$$-2.30 < fRn/fR < -1.20 \tag{11b}$$

$$-8.00 < M1/fw < -2.00 \tag{12b}$$

$$-2.50 < M2/fw < 1.50 \tag{13b}$$

$$-6.00 < MR/fw < -2.00 \tag{14b}$$

Next, the configuration of each lens unit will be described. In each embodiment, the first lens unit L1 comprises, in order from the object side to the image size, a cemented lens of a negative lens and positive lens, and a positive lens. In each embodiment, the refractive power of the first lens unit L1 is set relatively strong, to realize both high power of the zoom lens and reduction in size. Consequently, occurrence of spherical aberration at the telephoto end is pronounced IN THE first lens unit L1. The embodiments reduce occurrence of spherical aberration by distributing the positive refractive power among two lenses.

Also, due to setting the refractive power of the first lens unit L1 relatively strong, occurrence of chromatic aberration at the telephoto side is pronounced. The embodiments realize correction for chromatic aberration of the first lens unit L1 without making the refractive power of each lens stronger, by configuring the positive lenses using a material having a large Abbe number, and configuring the negative lenses using a material having a small Abbe number. In particular, axial chromatic aberration and chromatic aberration of magnification at the telephoto side are corrected well. Further, in the embodiments, of the positive lenses included in the first lens unit L1, the positive lens of which the material has the largest Abbe number is formed using a material of which the partial dispersion ratio is relatively large. Moreover, of the negative lenses included in the first lens unit L1, the negative lens of which the lens material has the smallest Abbe number is formed using a material of which the partial dispersion ratio is relatively small. Thus, secondary spectra of axial chromatic aberration can be suitably corrected.

In each embodiment, the second lens unit L2 comprises, in order from the object side to the image size, a negative lens, a negative lens, and a positive lens. Setting the refractive power of the second lens unit L2 to be set relatively strong results in pronounced occurrence of field curvature at the wide angle side, and pronounced occurrence of spherical aberration at the telephoto side. The embodiments reduce occurrence of such aberration by distributing the negative refractive power in the second lens unit L2 among two lenses.

In the first through fourth embodiments, the third lens unit L3 comprises, in order from the object side to the image size, a positive lens, a negative lens, and a positive lens. In the first through fourth embodiments, setting the zoom distribution OF THE third lens unit L3 to be high reduces the overall lens length at the wide angle end, and also gives relatively strong refractive power of the third lens unit L3. A relatively strong refractive power of the third lens unit L3 makes it easier for pronounced spherical aberration, comatic aberration, and axial chromatic aberration to occur over the entire zoom range. In the first through fourth embodiments, occurrence of such aberration is reduced by distributing the positive refractive power in the third lens unit L3 among two lenses.

Also, due to setting the refractive power of the third lens unit L3 relatively strong, occurrence of chromatic aberration at the telephoto side is pronounced. The embodiments realize correction for chromatic aberration of the third lens unit L3 without making the refractive power of each lens stronger, by configuring the positive lenses using a material having a large Abbe number, and configuring the negative lenses using a material having a small Abbe number. In particular, axial chromatic aberration and chromatic aberration of magnification at the telephoto side are corrected well. Further, in the embodiments, of the positive lenses included in the third lens unit L3, the positive lens of which the lens material has the largest Abbe number is formed using a material of which the partial dispersion ratio is relatively large. Moreover, of the negative lenses included in the third lens unit L3, the negative lens of which the material has the smallest Abbe number is formed using a material of which the partial dispersion ratio is relatively small. Thus, secondary spectra of axial chromatic aberration can be suitably corrected.

Also, in the fifth embodiment, the third lens unit L3 consists of one negative lens, thus reducing size of the zoom lens in the optical axis direction and also reducing weight.

Also, in the first through third embodiments, the fourth lens unit L4 consists of one negative lens, thus reducing size of the zoom lens in the optical axis direction and also reducing weight. In the fourth embodiment, the fourth lens unit L4 consists of a cemented lens of a positive lens and negative lens in order from the object side to the image side. Accordingly, occurrence of chromatic aberration of magnification can reduced even if the refractive power of the fourth lens unit L4 is made to be relatively strong.

In the fifth embodiment, the fourth lens unit L4 consists of a cemented lens of a positive lens, negative lens, positive lens, and negative lens in order from the object side to the image side. In the fifth embodiment, the refractive power of the fourth lens unit L4 is set to be relatively strong, in order to reduce the overall lens length at the wide angle end, by raising the zoom distribution of the fourth lens unit L4. A relatively strong refractive power of the fourth lens unit L4 makes it easier for pronounced spherical aberration, comatic aberration, and axial chromatic aberration to occur over the entire zoom range. In the fifth embodiment, occurrence of such aberration is reduced by distributing the positive refractive power in the fourth lens unit L4 among two lenses.

Also, due to setting the refractive power of the fourth lens unit L4 to be strong, occurrence of chromatic aberration at the telephoto side is pronounced. The fifth embodiment realizes correction for chromatic aberration of the fourth lens unit L4 without making the refractive power of each lens stronger, by configuring the positive lenses using a material having a large Abbe number, and configuring the negative lenses using a material having a small Abbe number. In particular, axial chromatic aberration and chromatic aberration of magnification at the telephoto side are corrected well. Further, in the embodiments, of the positive lenses included in the fourth lens unit L4, the positive lens of which the material has the largest Abbe number is formed using a material of which the partial dispersion ratio is relatively large. Moreover, of the negative lenses included in the fourth lens unit L4, the negative lens of which the material has the smallest Abbe number is formed using a material of which the partial dispersion ratio is relatively small. Thus, secondary spectra of axial chromatic aberration can be suitably corrected.

In the first through third embodiments, the fifth lens unit L5 consists of a cemented lens of a positive lens and negative lens in order from the object side to the image side. Accordingly, occurrence of chromatic aberration of magnification can reduced even if the refractive power of the fifth lens unit L5 is made to be relatively strong. Also, in the fifth embodiment, the fifth lens unit L5 consists of one negative lens, thus reducing size of the zoom lens in the optical axis direction and also reducing weight.

Also, in the fifth embodiment, the sixth lens unit L6 consists of one positive lens, thus reducing size of the zoom lens in the optical axis direction and also reducing weight.

Next, numerical embodiments 1 through 5, corresponding to the first through fifth embodiments of the present invention, are illustrated. In the numerical embodiments, i represents the order of an optical surface form the object side, ri represents the radius of curvature of the i'th optical surface (i'th surface), di represents the distance between the i'th surface and the i+1'th surface, and ndi and vdi represent the refractive power and Abbe number of the material of the i'th optical element as to the d-line.

The aspherical shape is expressed by $$x=(h^2/R)/[1+[1-(1+k)(h/R)^2]^{1/2}]+A4h^4+A6h^6+A8h^8+A10h^{10}$$

where k represents eccentricity, A4, A6, A8, and A10 are aspheric coefficients, and x represents displacement in the optical axis direction at a height h from the optical axis, with the surface vertex as a reference. Further, R represents paraxial radius of curvature. Further, the scientific notation "e-Z" is equivalent to the exponential notation "$10^{-Z}$", where "Z" is the exponential power. In the numerical embodiments, the two surfaces closest to the image are optical block surfaces, such as a filter, face plate, or the like.

In the embodiments, back focus (BF) represents the distance from the surface of the lens system closest to the image side, to the paraxial image plane, in terms of equivalent air length. The correlation as to the above-described Conditional Expressions in the numerical embodiments is illustrated in Table 2.

Note that the effective image circle diameter (diameter of the image circle) at the wide angle end can be made to be smaller than the effective image circle diameter at the telephoto end. This is because barrel distortion aberration which tends to occur at the wide angle side can be corrected by enlarging the image at the time of image processing.

Numerical Embodiment 1
Numerals in units of mm

Surface Data

| Surface number | r | d | nd | νd | θgF |
|---|---|---|---|---|---|
| 1 | 40.634 | 0.80 | 1.90798 | 25.6 | 0.603 |
| 2 | 23.816 | 3.00 | 1.49700 | 81.5 | 0.537 |
| 3 | 285.980 | 0.10 | | | |
| 4 | 26.539 | 2.20 | 1.71300 | 53.9 | 0.546 |
| 5 | 156.038 | (variable) | | | |
| 6 | 3702.482 | 0.42 | 1.88300 | 40.8 | 0.567 |
| 7 | 5.554 | 2.91 | | | |
| 8 | −19.501 | 0.40 | 1.80400 | 46.6 | 0.557 |
| 9 | 29.379 | 0.10 | | | |
| 10 | 11.616 | 1.29 | 1.95906 | 17.5 | 0.660 |
| 11 | 47.059 | (variable) | | | |
| 12* | 8.677 | 1.30 | 1.62263 | 58.2 | 0.539 |
| 13* | −21.504 | 1.65 | | | |
| 14 (diaphragm) | ∞ | 0.75 | | | |
| 15 | 15.701 | 0.50 | 1.90798 | 25.6 | 0.603 |
| 16 | 7.501 | 0.44 | | | |
| 17* | −85.397 | 1.40 | 1.55332 | 71.7 | 0.540 |
| 18 | −9.707 | (variable) | | | |
| 19 | −122.836 | 0.40 | 1.88300 | 40.8 | 0.567 |
| 20 | 23.859 | (variable) | | | |
| 21 | 15.838 | 2.80 | 1.77250 | 49.6 | 0.552 |
| 22 | −27.112 | 0.50 | 1.95906 | 17.5 | 0.660 |
| 23 | −81.077 | (variable) | | | |
| 24 | ∞ | 0.80 | 1.51633 | 64.1 | 0.535 |
| 25 | ∞ | 1.33 | | | |
| Image plane | ∞ | | | | |

Aspherical shape data

12th surface $K = 1.08383e+000$
$A4 = -3.60033e-004$
$A6 = 2.52054e-005$
$A8 = -9.60692e-007$
$A10 = 4.58790e-007$ 13th surface $K = 0.00000e+000$
$A4 = 4.73779e-004$
$A6 = 6.00253e-005$
$A8 = -5.23633e-006$
$A10 = 8.15817e-007$ 17th surface $K = 0.00000e+000$
$A4 = 1.21522e-003$
$A6 = 1.54155e-004$
$A8 = -1.94984e-005$
$A10 = 2.18702e-006$ 18th surface $K = -8.00316e+000$
$A4 = -2.77078e-004$
$A6 = 1.04005e-004$
$A8 = -5.06667e-006$
$A10 = 8.14801e-007$

Miscellaneous data
Zoom ratio 29.13

| | Wide angle | Intermediate | Telephoto |
|---|---|---|---|
| Focal length | 4.63 | 20.68 | 135.00 |
| F-number | 3.61 | 5.55 | 10.00 |
| Half angle of view | 35.73 | 10.61 | 1.64 |
| Image height | 3.33 | 3.88 | 3.88 |
| Overall lens length | 51.27 | 63.10 | 83.26 |
| BF | 9.67 | 17.33 | 2.84 |
| d5 | 0.71 | 13.37 | 26.18 |
| d11 | 17.58 | 4.98 | 0.45 |
| d18 | 0.68 | 4.20 | 9.95 |
| d20 | 1.67 | 2.25 | 22.89 |
| d23 | 7.81 | 15.48 | 0.98 |

Zoom lens unit data

| Unit | Starting surface | Focal length |
|---|---|---|
| 1 | 1 | 39.11 |
| 2 | 6 | −6.00 |
| 3 | 12 | 11.29 |
| 4 | 19 | −22.60 |
| 5 | 21 | 18.79 |

Numerical Embodiment 2
Numerals in units of mm

Surface Data

| Surface number | r | d | nd | νd | θgF |
|---|---|---|---|---|---|
| 1 | 38.032 | 0.80 | 1.93967 | 23.1 | 0.612 |
| 2 | 25.247 | 3.00 | 1.43875 | 94.9 | 0.534 |
| 3 | −1996.810 | 0.10 | | | |
| 4 | 26.357 | 2.20 | 1.71300 | 53.9 | 0.546 |
| 5 | 117.522 | (variable) | | | |
| 6 | −449.477 | 0.42 | 1.88300 | 40.8 | 0.567 |
| 7 | 5.613 | 2.91 | | | |
| 8 | −18.164 | 0.40 | 1.80400 | 46.6 | 0.557 |
| 9 | 26.328 | 0.10 | | | |
| 10 | 11.842 | 1.29 | 1.95906 | 17.5 | 0.660 |
| 11 | 656.664 | (variable) | | | |
| 12* | 9.616 | 1.30 | 1.62263 | 58.2 | 0.539 |
| 13* | −16.508 | 1.65 | | | |
| 14 (diaphragm) | ∞ | 0.75 | | | |
| 15 | 18.730 | 0.50 | 1.93967 | 23.1 | 0.612 |
| 16 | 8.561 | 0.33 | | | |
| 17* | −31.096 | 1.20 | 1.49700 | 81.5 | 0.537 |
| 18 | −9.046 | (variable) | | | |
| 19 | −56.207 | 0.40 | 1.88300 | 40.8 | 0.567 |
| 20 | 41.739 | (variable) | | | |
| 21 | 17.712 | 2.50 | 1.77250 | 49.6 | 0.552 |
| 22 | −27.140 | 0.50 | 1.95906 | 17.5 | 0.660 |
| 23 | −47.796 | (variable) | | | |
| 24 | ∞ | 0.80 | 1.51633 | 64.1 | 0.535 |
| 25 | ∞ | 1.33 | | | |
| Image plane | ∞ | | | | |

Aspherical shape data

12th surface $K = 8.31019e-001$
$A4 = -4.69061e-004$
$A6 = 2.02440e-005$
$A8 = -5.26020e-006$
$A10 = 2.86533e-007$ 13th surface $K = 0.00000e+000$
$A4 = 3.48343e-004$
$A6 = 4.81382e-005$
$A8 = -1.02132e-005$
$A10 = 6.72170e-007$ 17th surface $K = 0.00000e+000$
$A4 = 2.71971e-003$
$A6 = 1.74006e-004$ -continued

Numerical Embodiment 2
Numerals in units of mm

A8 = −1.67883e−005
A10 = 2.90032e−006
18th surface

K = −1.03856e+001
A4 = 2.62829e−004
A6 = 1.86517e−004
A8 = −4.21016e−006
A10 = 1.56308e−006

Miscellaneous data
Zoom ratio 29.21

|  | Wide angle | Intermediate | Telephoto |
|---|---|---|---|
| Focal length | 4.62 | 18.79 | 135.00 |
| F-number | 3.57 | 5.32 | 10.00 |
| Half angle of view | 35.79 | 11.65 | 1.64 |
| Image height | 3.33 | 3.88 | 3.88 |
| Overall lens length | 51.22 | 62.92 | 82.25 |
| BF | 10.12 | 16.29 | 2.84 |
| d5 | 0.79 | 12.63 | 25.51 |
| d11 | 17.04 | 5.32 | 0.45 |
| d18 | 0.23 | 5.60 | 14.26 |
| d20 | 2.70 | 2.74 | 18.85 |
| d23 | 8.26 | 14.43 | 0.98 |

Zoom lens unit data

| Unit | Starting surface | Focal length |
|---|---|---|
| 1 | 1 | 38.36 |
| 2 | 6 | −5.90 |
| 3 | 12 | 11.72 |
| 4 | 19 | −27.07 |
| 5 | 21 | 17.92 |

Numerical Embodiment 3
Numerals in units of mm

Surface Data

| Surface number | r | d | nd | vd | θgF |
|---|---|---|---|---|---|
| 1 | 37.822 | 0.80 | 2.00500 | 20.0 | 0.590 |
| 2 | 27.305 | 3.20 | 1.43875 | 94.9 | 0.534 |
| 3 | −220.194 | 0.10 | | | |
| 4 | 26.741 | 2.00 | 1.71300 | 53.9 | 0.546 |
| 5 | 82.743 | (variable) | | | |
| 6 | 1721.190 | 0.42 | 1.88300 | 40.8 | 0.567 |
| 7 | 5.466 | 2.72 | | | |
| 8 | −17.118 | 0.40 | 1.80400 | 46.6 | 0.557 |
| 9 | 24.863 | 0.10 | | | |
| 10 | 11.355 | 1.29 | 1.95906 | 17.5 | 0.660 |
| 11 | 78.184 | (variable) | | | |
| 12* | 9.826 | 1.30 | 1.62263 | 58.2 | 0.539 |
| 13* | −15.564 | 1.65 | | | |
| 14 (diaphragm) | ∞ | 0.75 | | | |
| 15 | 18.450 | 0.50 | 2.00500 | 20.0 | 0.590 |
| 16 | 8.761 | 0.28 | | | |
| 17* | −24.269 | 1.20 | 1.55332 | 71.7 | 0.540 |
| 18 | −10.419 | (variable) | | | |
| 19 | −44.235 | 0.40 | 1.88300 | 40.8 | 0.567 |
| 20 | 69.553 | (variable) | | | |
| 21 | 19.603 | 2.30 | 1.77250 | 49.6 | 0.552 |
| 22 | −20.853 | 0.50 | 1.95906 | 17.5 | 0.660 |
| 23 | −27.059 | (variable) | | | |
| 24 | ∞ | 0.80 | 1.51633 | 64.1 | 0.535 |
| 25 | ∞ | 1.33 | | | |
| Image plane | ∞ | | | | |

Aspherical shape data

Numerical Embodiment 3
Numerals in units of mm

12th surface

K = 5.92830e−001
A4 = −6.07357e−004
A6 = 3.01234e−005
A8 = −8.11948e−006
A10 = 8.97946e−007
13th surface K = 0.00000e+000
A4 = 2.36075e−004
A6 = 4.87042e−005
A8 = −1.02790e−005
A10 = 1.18150e−006
17th surface K = 0.00000e+000
A4 = 3.52407e−003
A6 = 1.70302e−004
A8 = −5.34955e−006
A10 = 2.53149e−006
18th surface K = −1.55415e+001
A4 = 8.77478e−004
A6 = 2.44808e−004
A8 = −9.73989e−006
A10 = 2.87830e−006

Miscellaneous data
Zoom ratio 29.13

|  | Wide angle | Intermediate | Telephoto |
|---|---|---|---|
| Focal length | 4.50 | 15.34 | 135.00 |
| F-number | 3.43 | 5.00 | 10.00 |
| Half angle of view | 36.53 | 14.18 | 1.64 |
| Image height | 3.33 | 3.88 | 3.88 |
| Overall lens length | 51.24 | 63.08 | 83.22 |
| BF | 10.00 | 12.63 | 2.85 |
| d5 | 0.78 | 11.00 | 25.56 |
| d11 | 16.91 | 6.89 | 0.45 |
| d18 | 0.27 | 10.52 | 24.30 |
| d20 | 3.37 | 2.13 | 10.15 |
| d23 | 8.14 | 10.78 | 0.99 |

Zoom lens unit data

| Unit | Starting surface | Focal length |
|---|---|---|
| 1 | 1 | 38.55 |
| 2 | 6 | −5.94 |
| 3 | 12 | 12.40 |
| 4 | 19 | −30.57 |
| 5 | 21 | 15.56 |

Numerical Embodiment 4
Numerals in units of mm

Surface Data

| Surface number | r | d | nd | vd | θgF |
|---|---|---|---|---|---|
| 1 | 36.445 | 1.00 | 1.90798 | 25.6 | 0.603 |
| 2 | 24.370 | 2.90 | 1.49700 | 81.5 | 0.537 |
| 3 | 110.188 | 0.20 | | | |
| 4 | 28.919 | 2.30 | 1.69680 | 55.5 | 0.543 |
| 5 | 128.011 | (variable) | | | |
| 6 | −208.104 | 0.65 | 1.80400 | 46.6 | 0.557 |
| 7 | 6.853 | 3.75 | | | |
| 8 | −16.320 | 0.50 | 1.69680 | 55.5 | 0.543 |

Numerical Embodiment 4
Numerals in units of mm

| | | | | | |
|---|---|---|---|---|---|
| 9 | 52.484 | 0.20 | | | |
| 10 | 16.058 | 1.25 | 1.95906 | 17.5 | 0.660 |
| 11 | 53.416 | (variable) | | | |
| 12 (diaphragm) | ∞ | 1.02 | | | |
| 13* | 6.797 | 2.20 | 1.55332 | 71.7 | 0.540 |
| 14* | −28.714 | 0.62 | | | |
| 15 | 8.404 | 0.70 | 1.90798 | 25.6 | 0.603 |
| 16 | 5.333 | 0.38 | | | |
| 17 | 9.268 | 1.40 | 1.48749 | 70.2 | 0.530 |
| 18 | 11.609 | (variable) | | | |
| 19 | 16.435 | 2.20 | 1.77250 | 49.6 | 0.552 |
| 20 | −20.764 | 0.50 | 1.84666 | 23.9 | 0.620 |
| 21 | 317.434 | (variable) | | | |
| 22 | ∞ | 0.60 | 1.51633 | 64.1 | 0.535 |
| 23 | ∞ | 1.85 | | | |
| Image plane | ∞ | | | | |

Aspherical shape data

13th surface

K = −2.12221e−001
A4 = −2.03046e−004
A6 = 3.68336e−006
A8 = −2.91033e−007
A10 = −1.14353e−009

14th surface

K = 4.01631e+001
A4 = 3.84141e−004
A6 = 9.38372e−006

Miscellaneous data
Zoom ratio 29.13

| | Wide angle | Intermediate | Telephoto |
|---|---|---|---|
| Focal length | 5.15 | 26.33 | 98.00 |
| F-number | 3.63 | 4.61 | 7.07 |
| Half angle of view | 33.51 | 8.37 | 2.26 |
| Image height | 3.41 | 3.88 | 3.88 |
| Overall lens length | 58.99 | 69.65 | 86.71 |
| BF | 5.29 | 16.03 | 3.45 |
| d5 | 0.70 | 18.94 | 29.03 |
| d11 | 21.06 | 3.51 | 1.05 |
| d18 | 10.15 | 9.39 | 31.40 |
| d21 | 3.05 | 13.79 | 1.21 |

Zoom lens unit data

| Unit | Starting surface | Focal length |
|---|---|---|
| 1 | 1 | 45.07 |
| 2 | 6 | −7.14 |
| 3 | 13 | 14.18 |
| 4 | 19 | 24.30 |

Numerical Embodiment 5
Numerals in units of mm

Surface Data

| Surface number | r | d | nd | vd | θgF |
|---|---|---|---|---|---|
| 1 | 34.863 | 0.85 | 1.90798 | 25.6 | 0.603 |
| 2 | 19.825 | 4.10 | 1.49700 | 81.5 | 0.537 |
| 3 | 186.233 | 0.05 | | | |
| 4 | 22.087 | 2.15 | 1.77250 | 49.6 | 0.552 |
| 5 | 128.649 | (variable) | | | |
| 6 | 146.331 | 0.70 | 1.85135 | 40.1 | 0.569 |
| 7* | 7.003 | 3.80 | | | |
| 8 | −12.046 | 0.40 | 1.88300 | 40.8 | 0.567 |
| 9 | 41.033 | 0.15 | | | |
| 10 | 22.994 | 1.75 | 1.95906 | 17.5 | 0.660 |
| 11 | −31.289 | (variable) | | | |
| 12 | ∞ | 8.50 | 1.80610 | 33.3 | 0.588 |
| 13 | ∞ | 1.00 | | | |
| 14 | −12.019 | 0.50 | 1.48749 | 70.2 | 0.530 |
| 15 | −19.774 | (variable) | | | |
| 16* | 8.155 | 1.90 | 1.55332 | 71.7 | 0.540 |
| 17* | −72.093 | 0.80 | | | |
| 18 (diaphragm) | ∞ | 1.00 | | | |
| 19 | 10.647 | 0.60 | 1.93967 | 23.1 | 0.612 |
| 20 | 7.969 | 1.40 | | | |
| 21* | 61.797 | 2.70 | 1.58313 | 59.4 | 0.542 |
| 22 | −6.235 | 0.50 | 1.83481 | 42.7 | 0.564 |
| 23 | −15.519 | (variable) | | | |
| 24 | −35.736 | 0.50 | 1.53172 | 48.8 | 0.563 |
| 25 | 32.997 | (variable) | | | |
| 26 | 15.263 | 2.10 | 1.48749 | 70.2 | 0.530 |
| 27 | −35.938 | (variable) | | | |
| 28 | ∞ | 0.80 | 1.51633 | 64.1 | 0.535 |
| 29 | ∞ | 2.10 | | | |
| Image plane | ∞ | | | | |

Aspherical shape data

7th surface

K = 1.96362e−001
A4 = −8.26678e−005
A6 = −4.26762e−006
A8 = 1.25230e−007
A10 = −3.66704e−009

16th surface

K = −4.50739e−001
A4 = 7.59534e−005
A6 = −1.46153e−006
A8 = 5.28809e−008
A10 = 6.36279e−015

17th surface

K = −7.59766e+001
A4 = 1.12454e−004
A6 = −5.89864e−006
A8 = 1.80039e−007
A10 = −4.12690e−009

21st surface

K = −2.82583e+001
A4 = −1.09884e−004
A6 = −6.24161e−006
A8 = −2.01055e−007
A10 = −3.18092e−009

Miscellaneous data
Zoom ratio 29.13

| | Wide angle | Intermediate | Telephoto |
|---|---|---|---|
| Focal length | 5.09 | 20.73 | 78.00 |
| F-number | 3.36 | 4.63 | 6.18 |
| Half angle of view | 33.80 | 10.59 | 2.84 |
| Image height | 3.41 | 3.88 | 3.88 |
| Overall lens length | 76.23 | 80.10 | 87.62 |
| BF | 9.68 | 13.34 | 4.86 |
| d5 | 0.45 | 10.25 | 18.20 |
| d11 | 7.05 | 1.12 | 0.70 |
| d15 | 14.58 | 4.31 | 0.35 |
| d23 | 2.48 | 12.75 | 16.71 |
| d25 | 6.54 | 2.88 | 11.35 |
| d27 | 7.05 | 10.71 | 2.23 |

Zoom lens unit data

| Unit | Starting surface | Focal length |
|---|---|---|

-continued

Numerical Embodiment 5
Numerals in units of mm

| 1 | 1 | 31.83 |
|---|---|---|
| 2 | 6 | −7.28 |
| 3 | 14 | −64.23 |
| 4 | 16 | 14.30 |
| 5 | 24 | −32.18 |
| 6 | 26 | 22.28 |

TABLE 2

|  | FIRST EMBODIMENT | SECOND EMBODIMENT | THIRD EMBODIMENT | FOURTH EMBODIMENT | FIFTH EMBODIMENT |
|---|---|---|---|---|---|
| v1n | 25.60 | 23.10 | 20.00 | 25.60 | 25.60 |
| vRn | 25.60 | 23.10 | 20.00 | 25.60 | 23.10 |
| LEFT SIDE OF CONDITIONAL EXPRESSION (3) | 0.60 | 0.61 | 0.59 | 0.60 | 0.60 |
| RIGHT SIDE OF CONDITIONAL EXPRESSION (3) | 0.61 | 0.62 | 0.63 | 0.61 | 0.61 |
| LEFT SIDE OF CONDITIONAL EXPRESSION (4) | 0.60 | 0.61 | 0.59 | 0.60 | 0.61 |
| RIGHT SIDE OF CONDITIONAL EXPRESSION (4) | 0.61 | 0.62 | 0.63 | 0.61 | 0.62 |
| $(\theta gF1n - \theta gF1p)/(vd1n - vd1p)$ | −0.00117 | −0.00108 | −0.00074 | −0.00117 | −0.00117 |
| $(\theta gFRn - \theta gFRp)/(vdRn - vdRp)$ | −0.00136 | −0.00127 | −0.00097 | −0.00136 | −0.00147 |
| f1/ft | 0.290 | 0.284 | 0.286 | 0.460 | 0.408 |
| f2/ft | −0.044 | −0.044 | −0.044 | −0.073 | −0.093 |
| fR/ft | 0.084 | 0.087 | 0.092 | 0.145 | 0.225 |
| f1n/f1 | −1.658 | −2.149 | −2.635 | −1.871 | −1.634 |
| fRn/fR | −1.443 | −1.467 | −1.375 | −1.271 | −2.153 |
| M1/fw | −6.904 | −6.714 | −7.109 | −5.383 | −2.237 |
| M2/fw | −1.408 | −1.366 | −1.601 | 0.117 | 1.247 |
| MR/fw | −5.104 | −4.954 | −5.260 | −3.769 | −2.792 |

Next, an embodiment of a digital still camera using the zoom lens according to the present invention as an image pickup optical system will be described with reference to FIG. 11. In FIG. 11, reference numeral 20 denotes a camera body, and 21 denotes an image pickup optical system configured using one of the zoom lenses described in the first through fifth embodiments. Reference numeral 22 denotes a solid state image pickup element (photoelectric conversion element) such as a CCD sensor or CMOS sensor or the like, which is built into the camera body 20 and receives a subject image formed by the image pickup optical system 21. Reference numeral 23 denotes memory which records information of images corresponding to subject images subjected to photoelectric conversion by the solid state image pickup element 22. Reference numeral 24 denotes a viewfinder configured using a liquid crystal display panel or the like, for observing a subject image formed by the solid state image pickup element 22. Applying the zoom lens according to the present invention to an image pickup apparatus such as a digital still camera or the like obtains an image pickup apparatus in which chromatic aberration is suitably corrected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-253639 filed Dec. 6, 2013, which is hereby incorporated by reference herein in its entirety.

What is claimed is:

1. A zoom lens comprising, in order from an object side to an image side:
   a first lens unit having positive refractive power;
   a second lens unit having negative refractive power; and
   a rear lens group having a plurality of lens units at least one of which has positive refractive power,
   wherein the distance between the first lens unit and the second lens unit is greater at a telephoto end as compared to at a wide angle end,
   wherein the first lens unit includes a positive lens and a negative lens,
   wherein the rear lens group includes a lens unit R comprising a positive lens and a negative lens, the lens unit R having the highest zoom ratio among the lens units included in the rear lens group,
   and wherein the conditional expressions $$5.0 < vd1n < 27.0$$

$$5.0 < vdRn < 27.0$$

$$\theta gF1n < 2.381 \times 10^{-4} \cdot vd1n^2 - 1.448 \times 10^{-2} \cdot vd1n + 0.8223$$

$$\theta gFRn < 2.381 \times 10^{-4} \cdot vdRn^2 - 1.448 \times 10^{-2} \cdot vdRn + 0.8223$$

$$-0.00150 < (\theta gF1n - \theta gF1p)/(vd1n - vd1p)$$

$$-0.00150 < (\theta gFRn - \theta gFRp)/(vdRn - vdRp)$$

are satisfied, where
   of the positive lenses included in the first lens unit,
      vd1p represents the Abbe number of the material of the positive lens of which the Abbe number of the lens material is the greatest, and
      θgF1p represents the partial dispersion ratio thereof, of the negative lenses included in the first lens unit,
νd1n represents the Abbe number of the material of the negative lens of which the Abbe number of the lens material is the smallest, and
θgF1n represents the partial dispersion ratio thereof,
of the positive lenses included in the lens unit R,
νdRp represents the Abbe number of the material of the positive lens of which the Abbe number of the lens material is the greatest, and
θgFRp represents the partial dispersion ratio thereof, and
of the negative lenses included in the lens unit R,
νdRn represents the Abbe number of the material of the negative lens of which the Abbe number of the lens material is the smallest, and
θgFRn represents the partial dispersion ratio thereof.

2. The zoom lens according to claim 1, wherein the conditional expression $$0.10 < f1/ft < 0.70$$

is satisfied, where f1 represents the focal length of the first lens unit, and ft represents the focal length of the zoom lens at the telephoto end.

3. The zoom lens according to claim 1, wherein the conditional expression $$-0.200 < f2/ft < -0.010$$

is satisfied, where f2 represents the focal length of the second lens unit, and ft represents the focal length of the zoom lens at the telephoto end.

4. The zoom lens according to claim 1, wherein the conditional expression $$0.020 < fR/ft < 0.300$$

is satisfied, where fR represents the focal length of the lens unit R, and ft represents the focal length of the zoom lens at the telephoto end.

5. The zoom lens according to claim 1, wherein the conditional expression $$-4.00 < f1n/f1 < -1.00$$

is satisfied, where f1n represents the focal length of the negative lens of which the lens material has the smallest Abbe number of the negative lenses included in the first lens unit, and f1 represents the focal length of the first lens unit.

6. The zoom lens according to claim 1, wherein the conditional expression $$-3.00 < fRn/fR < -1.00$$

is satisfied, where fRn represents the focal length of the negative lens of which the lens material has the smallest Abbe number of the negative lenses included in the lens unit R, and fR represents the focal length of the lens unit R.

7. The zoom lens according to claim 1, wherein the conditional expression $$-10.00 < M1/fw < -1.00$$

is satisfied, where fw represents the focal length of the zoom lens at the wide angle end, and M1 represents the amount of movement on the optical axis of the first lens unit, when zooming from the wide angle end to the telephoto end.

8. The zoom lens according to claim 1, wherein the conditional expression $$-4.00 < M2/fw < 3.00$$

is satisfied, where fw represents the focal length of the zoom lens at the wide angle end, and M2 represents the amount of movement on the optical axis of the second lens unit, when zooming from the wide angle end to the telephoto end.

9. The zoom lens according to claim 1, wherein the conditional expression $$-8.00 < MR/fw < -1.00$$

is satisfied, where fw represents the focal length of the zoom lens at the wide angle end, and MR represents the amount of movement on the optical axis of the lens unit R, when zooming from the wide angle end to the telephoto end.

10. The zoom lens according to claim 1, wherein the rear unit consists of a third lens unit having positive refractive power, and a fourth lens unit having positive refractive power.

11. The zoom lens according to claim 1, wherein the rear unit consists of a third lens unit having positive refractive power, a fourth lens unit having negative refractive power, and a fifth lens unit having positive refractive power.

12. The zoom lens according to claim 1, wherein the rear unit consists of a third lens unit having negative refractive power, a fourth lens unit having positive refractive power, a fifth lens unit having negative refractive power, and a sixth lens unit having positive refractive power.

13. An image pickup apparatus comprising:
a zoom lens; and
an image sensor configured to receive an image formed by the zoom lens,
wherein the zoom lens comprises, in order from an object side to an image side:
a first lens unit having positive refractive power,
a second lens unit having negative refractive power, and
a rear lens group having a plurality of lens units at least one of which has positive refractive power,
wherein the distance between the first lens unit and the second lens unit is greater at a telephoto end as compared to at a wide angle end,
wherein the first lens unit includes a positive lens and a negative lens,
wherein the rear lens group includes a lens unit R comprising a positive lens and a negative lens, the lens unit R having the highest zoom ratio among the lens units included in the rear lens group,
and wherein the conditional expressions $$5.0 < \nu d1n < 27.0$$

$$5.0 < \nu dRn < 27.0$$

$$\theta gF1n < 2.381 \times 10^{-4} \cdot \nu d1n^2 - 1.448 \times 10^{-2} \cdot \nu d1n + 0.8223$$

$$\theta gFRn < 2.381 \times 10^{-4} \cdot \nu dRn^2 - 1.448 \times 10^{-2} \cdot \nu dRn + 0.8223$$

$$-0.00150 < (\theta gF1n - \theta gF1p)/(\nu d1n - \nu d1p)$$

$$-0.00150 < (\theta gFRn - \theta gFRp)/(\nu dRn - \nu dRp)$$

are satisfied, where
of the positive lenses included in the first lens unit,
νd1p represents the Abbe number of the material of the positive lens of which the Abbe number of the lens material is the greatest, and
θgF1p represents the partial dispersion ratio thereof, of the negative lenses included in the first lens unit,
- $\nu d1n$ represents the Abbe number of the material of the negative lens of which the Abbe number of the lens material is the smallest, and
- $\theta gF1n$ represents the partial dispersion ratio thereof, of the positive lenses included in the lens unit R,
- $\nu dRp$ represents the Abbe number of the material of the positive lens of which the Abbe number of the lens material is the greatest, and
- $\theta gFRp$ represents the partial dispersion ratio thereof, and of the negative lenses included in the lens unit R,
- $\nu dRn$ represents the Abbe number of the material of the negative lens of which the Abbe number of the lens material is the smallest, and
- $\theta gFRn$ represents the partial dispersion ratio thereof.

* * * * *